US011528350B2

(12) United States Patent
Lim et al.

(10) Patent No.: US 11,528,350 B2
(45) Date of Patent: Dec. 13, 2022

(54) HINGED ELECTRONIC DEVICE WITH DISPLACEMENT ALTERING HINGE AND CORRESPONDING SYSTEMS

(71) Applicant: Motorola Mobility LLC, Chicago, IL (US)

(72) Inventors: Yongho Lim, Kildeer, IL (US); Alberto R. Cavallaro, Northbrook, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 17/018,932

(22) Filed: Sep. 11, 2020

(65) Prior Publication Data
US 2022/0086264 A1    Mar. 17, 2022

(51) Int. Cl.
*H04M 1/02* (2006.01)

(52) U.S. Cl.
CPC ....... *H04M 1/0216* (2013.01); *H04M 1/0268* (2013.01)

(58) Field of Classification Search
CPC ..... H04M 1/0216; H04M 1/0268; G06F 1/16; G06F 1/1616; G06F 1/1681; G06F 1/1652
See application file for complete search history.

(56) References Cited

U.S. PATENT DOCUMENTS

| | | | |
|---|---|---|---|
| 8,483,784 B2 | 7/2013 | Griffin | |
| 10,601,967 B1 | 3/2020 | Harmon et al. | |
| 10,845,850 B1 | 11/2020 | Kang | |
| 2015/0241925 A1* | 8/2015 | Seo | G06F 1/1681 361/679.27 |
| 2017/0139663 A1* | 5/2017 | Ahn | G09G 3/2092 |
| 2017/0374749 A1* | 12/2017 | Lee | E05D 11/0054 |
| 2018/0242466 A1* | 8/2018 | Lee | H05K 5/0217 |
| 2018/0341295 A1* | 11/2018 | Lan | G06F 1/1679 |
| 2020/0359514 A1* | 11/2020 | Lin | E05D 3/18 |
| 2020/0392983 A1* | 12/2020 | Chang | G06F 1/1681 |
| 2021/0011513 A1* | 1/2021 | Watamura | G06F 1/1641 |

OTHER PUBLICATIONS

Moussa, Ait, "Introduction to Mechanisms and Kinematics"; University of Central Oklahoma Dept of Engineering & Physics; Chapter 1 Lecture; http://www.engineering.uco.edu/~aaitmoussa/Courses/ENGR3153/Lectures/Chapter1/chapter_1b.pdf; Unknown Publication Date but prior to filing of present application.
Soltanzadeh, Maryam , "NonFinal Office Action", U.S. Appl. No. 16/953,251, filed Nov. 19, 2020; dated Mar. 22, 2022.

* cited by examiner

*Primary Examiner* — Yuwen Pan
*Assistant Examiner* — Angelica M Perez
(74) *Attorney, Agent, or Firm* — Philip H. Burrus, IV

(57) ABSTRACT

An electronic device includes first device housing and a second device housing. The electronic device included a hinge housing with a hinge coupled to the first device housing and the second device housing such that the first device housing is pivotable about the hinge housing between an axially displaced open position and a closed position. The hinge of the hinge housing changes a displacement between the hinge housing and the first device housing and second device housing, respectively, when the first device housing and the second device housing pivot about the hinge housing between the axially displaced open position and the closed position.

20 Claims, 17 Drawing Sheets

HINGED ELECTRONIC DEVICE WITH DISPLACEMENT ALTERING HINGE AND CORRESPONDING SYSTEMS

BACKGROUND

Technical Field

This disclosure relates generally to electronic devices, and more particularly to hinged electronic devices.

Background Art

Portable electronic communication devices, especially smartphones, have become ubiquitous. People all over the world use such devices to stay connected. These devices have been designed in various mechanical configurations. A first configuration, known as a "candy bar," is generally rectangular in shape, has a rigid form factor, and has a display disposed along a major face of the electronic device. By contrast, a "clamshell" device has a mechanical hinge that allows one housing to pivot relative to the other.

Some consumers prefer candy bar devices, while others prefer clamshell devices. To satisfy the latter, it would thus be desirable to have an improved hinged electronic device.

Figure 1:
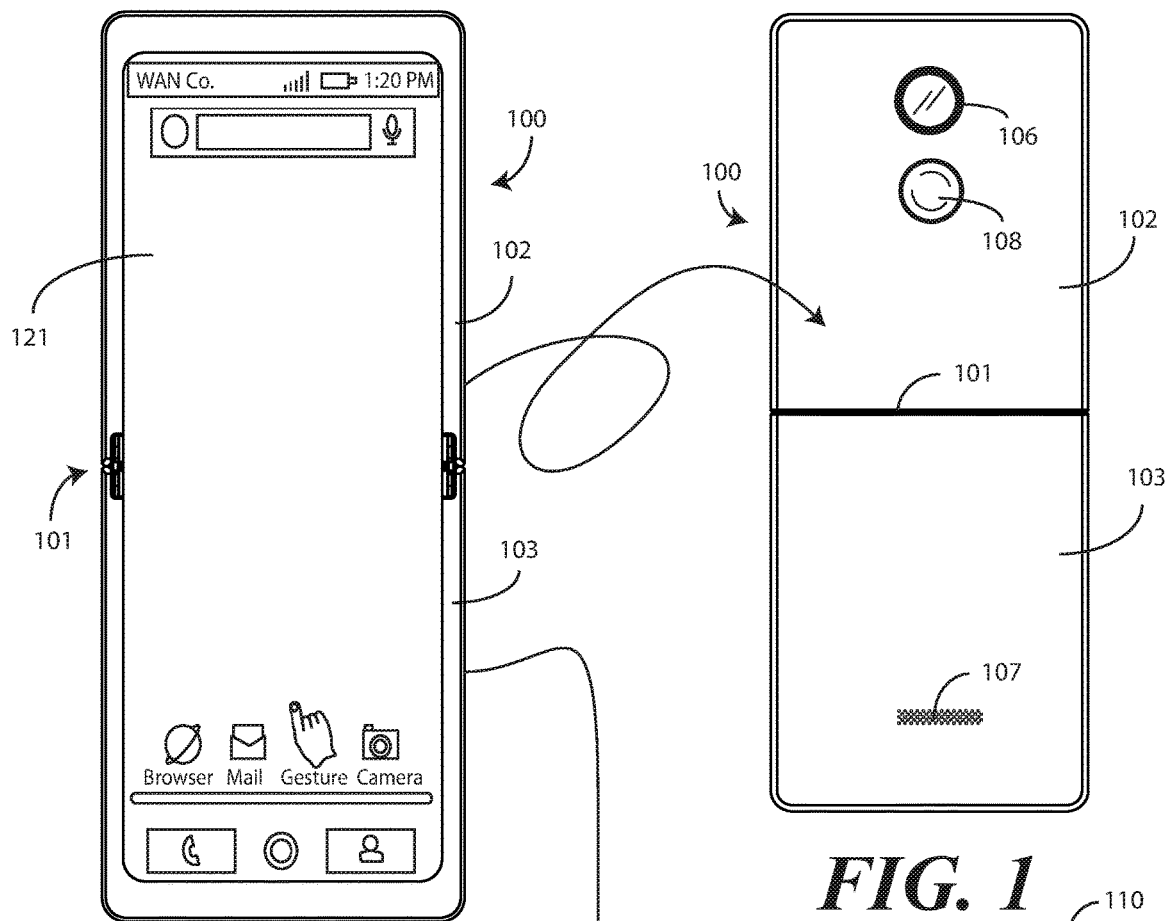
FIG. 1 illustrates one explanatory electronic device in accordance with one or more embodiments of the disclosure.
Figure 1:
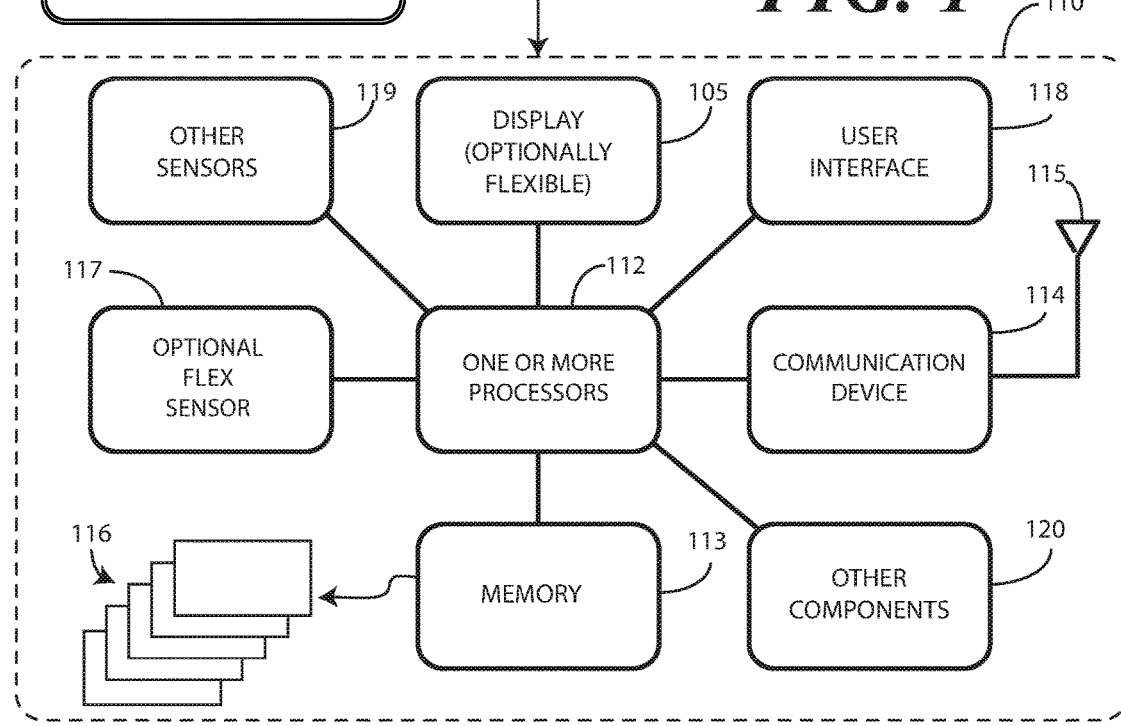

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Relational terms such as first and second, top and bottom, and the like may be used solely to distinguish one entity or action from another entity or action without necessarily requiring or implying any actual such relationship or order between such entities or actions. As used herein, components may be "operatively coupled" when information can be sent between such components, even though there may be one or more intermediate or intervening components between, or along the connection path.

The terms "substantially", "essentially", "approximately", "about" or any other version thereof, are defined as being close to as understood by one of ordinary skill in the art, and in one non-limiting embodiment the term is defined to be within ten percent, in another embodiment within five percent, in another embodiment within one percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide an electronic device that includes at least a first device housing and a second device housing. In one or more embodiments, a hinge couples the first device housing to the second device housing so that the first device housing is pivotable about the hinge relative to the second device housing to one or more of a bent configuration, a folded configuration, or other configuration.

In one or more embodiments, a flexible display is coupled to the first device housing and the second device housing and spans the hinge. The flexible display deforms when the first device housing pivots about the hinge relative to the second device housing. In other embodiments, the first device housing and the second device housing each have coupled thereto a separate display, which may be rigid or flexible. For example, a first display may be coupled to the first device housing on one side of the hinge, while a second display is coupled to the second device housing on a second side of the hinge.

In one or more embodiments, the hinge not only facilitates the bending operation, but also works to improve the reliability and usability of the flexible display. In one or more embodiments, the hinge does this via the use of one or more support plates that are coupled to a hinge housing and are pivotable relative to the hinge housing when the first device housing pivots about the hinge relative to the second device housing.

In one or more embodiments, a first support plate is pivotally coupled to a first side of the hinge housing. The first support plate then extends distally into the first device housing from the first side of the hinge housing. Similarly, a second support plate is pivotally coupled to a second side of the hinge housing. The second support plate extends distally into the second device housing from the second side of the hinge housing.

The hinge housing and its corresponding support plates serve two functions. First, they provide mechanical support for the flexible display when the first device housing has pivoted about the hinge relative to the second device housing to an axially displaced open position. However, when the first device housing pivots about the hinge relative to the second device housing to a closed position, in which interior surfaces of the first device housing and the second device housing abut, the support plates translate along inclined planes within the first device housing and second device housing, respectively, to recede into the first device housing and second device housing. Said differently, when the first device housing pivots about the hinge relative to the second device housing to the closed position, the support plates move toward the exterior surfaces of the first device housing and the second device housing, thereby receding "outward" from the interior surfaces of the first device housing and the second device housing. This "collapse" of the first support plate and the second support plate creates a cavity in the hinge portion of the electronic device that allows the flexible display to form a service loop when the electronic device is in the closed position. The service loop prevents the flexible display from being damaged or developing memory in the folded position when the electronic device is in the closed position.

Embodiments of the disclosure contemplate that bending operations occurring in a housing of an electronic device with a flexible display can present technical challenges. Illustrating by example, it can be difficult to provide uniform mechanical support beneath the flexible display when the electronic device is in the open position. It can further be difficult to limit deformation due to bending operations such that the deformation occurs within a predefined radius.

Advantageously, embodiments of the disclosure provide solutions to each one of these challenges. Specifically hinges configured in accordance with one or more embodiments of the disclosure provide a solution that provides the needed system flexibility by providing support for the flexible display when in the open position, but allows for a large radius service loop of the flexible display to occur when the electronic device is in the closed position.

In one or more embodiments, each of the first device housing and the second device housing defines a support plate receiving recess at the hinged portion of the electronic device. In one or more embodiments, these support plate receiving recesses each comprise an inclined plane, which is physically separated from the hinge housing of the hinge by a predefined distance. A distal end of each support plate contacts the inclined plane to translate along the inclined plane when the first device housing pivots about the hinge relative to the second device housing. Thus, if a first side of a first support plate is coupled to the hinge housing, a second, distal side of the first support plate contacts the inclined plane in the support plate receiving recess of the first device housing. The second, distal side of the first support plate then translates along the inclined plane when the first device housing pivots about the hinge relative to the second device housing. A second support plate and support plate receiving recess can be similarly configured in the second device housing.

The distal ends of each of the first support plate and the second support plate therefore travel, in one or more embodiments, along their respective inclined planes between a first position within the first device housing and the second device housing, respectively, to a second position within the first device housing and the second device housing, respectively, when the first device housing and the second device housing pivot about the hinge from an axially displaced open position to a closed position. In one or more embodiments, the support plates are closer to the flexible display when in the first position and are farther from the flexible display when in the second position. In one or more embodiments, the support plates are farther from exterior surfaces of the first device housing and the second device housing when in the first position but are closer to those outer surfaces of the first device housing and the second device housing when in the second position. This results in the second position being deeper within the first device housing and the second device housing, respectively, than the first position.

In one or more embodiments, the flexible display is positioned within a linear recess of the first device housing and the second device housing so that it—or a fascia disposed atop the flexible display—can be flush with the interior surfaces of the first device housing and second device housing, respectively. In other embodiments, the linear recess will be omitted, and the flexible display will simply sit atop planar interior surfaces of the first device housing and the second device housing. In either embodiment, when the first device housing pivots about the hinge relative to the second device housing to the axially displaced, open position, the first support plate, the hinge housing, and the second support plate bridge the linear recess (or planar interior surfaces) to provide mechanical support for the flexible display. By contrast, by receding into the housings, the first support plate, the hinge housing, and the second support plate define boundaries within which the flexible display defines a service loop when the first device housing and the second device housing pivot about the hinge from the axially displaced open position to a closed position.

Embodiments of the disclosure thus provide a novel hinge mechanism that properly supports a flexible display when a hinged electronic device is in the open position. Embodiments of the disclosure contemplate that the mechanical stack of the flexible display is frequently too soft or flexible to support itself. Accordingly, when the electronic device is in the axially displaced open position the support plates provide rigid support across the hinge portion of the electronic device. At the same time, the support plates receded into the housing when the electronic device is folded to allow the flexible display to form a service loop. Advantageously, the hinge housing and corresponding support plates define kinematic linkages that move when the first device housing pivots about the hinge relative to the second device housing to the closed position. As noted above, the support plates recede backwards (along the Z-axis) to provide space for the flexible display to bend into a teardrop shaped service loop.

Embodiments of the disclosure contemplate that when the flexible display is fixedly coupled to the first device housing and also fixedly coupled to the second device housing, with the first device housing, hinge, and second device housing configured to cause the flexible display to extend and become substantially planar when the first device housing and second device housing are in the axially displaced open position, the path length of the mechanical mechanism defined by the first support plate, the second support plate, and the hinge housing can be different than the path length of the flexible display when each is in the closed position. Said differently, for an electronic device configured to extend a flexible display flat when in the axially displaced open position, when the electronic device is in the closed position, the length of the service loop defined by the flexible display and the mechanical boundaries defined by the first support plate, hinge housing, and second support plate may be different. In particular, to provide sufficient room for the service loop, the mechanical mechanism defined by the first support plate, the hinge housing, and the second support plate may be longer than the length of display that bends to define the service loop. This difference in length can be problematic in that it can result in either deformations in the service loop when the electronic device is in the closed position, or alternatively mechanical strain or unevenness in the flexible display when the electronic device is in the axially displaced open position.

While a spring-loaded plate can be used to apply tension to one end of the flexible display to compensate for the distance differential, experimental testing has shown that this can cause the flexible display to "feel" like its moving when a user is delivering user input to the flexible display. Advantageously, embodiments of the disclosure provide an improved hinge mechanism that eliminates the need for any spring-loaded plate. Hinges configured in accordance with embodiments of the disclosure allow for the flexible display to be fixedly connected to the first device housing and second device housing, respectively, and to fully extend when the electronic device is in the axially displaced open position, yet form a proper service loop when the electronic device is in the closed position.

Embodiments of the disclosure accomplish this by employing a hinge mechanism that changes a displacement between a hinge housing and the first device housing and second device housing, respectively, as the first device housing and second device housing pivot about the hinge housing between the axially displaced open position and the closed position. Effectively, hinges configured in accordance with embodiments of the disclosure cause the hinge housing to get closer to the first device housing and second device housing, respectively, when the electronic device is in the axially displaced open position, and farther from the hinge housing when the electronic device is in the closed position. This changing distance compensates for the difference between the bending length of the flexible display and the length of the mechanical mechanism supporting the flexible display.

In one or more embodiments, a hinge housing comprising a hinge couples a first device housing of an electronic device to a second device housing such that the first device housing is pivotable about the hinge housing relative to the second device housing between a closed position and an axially displaced open position. In one or more embodiments, the hinge changes a displacement between the first device housing and the second device housing, respectively, when the first device housing and the second device housing pivot about the hinge housing between the axially displaced open position and the closed position. This allows an interior face of the hinge housing to be positioned farther from the first device housing and the second device housing, respectively, when the first device housing is pivoted about the hinge housing relative to the second device housing to the closed position than when the first device housing is pivoted about the hinge housing relative to the second device housing to the axially displaced open position.

In one or more embodiments, a first sliding link couples the hinge to the first device housing at a first pivot point while a second sliding link couples the hinge to the second device housing at a second pivot point. A first linking arm is then coupled to the first sliding link, while a second linking arm is coupled to the second sliding link.

In one or more embodiments, each of the first sliding link and the second sliding link define an aperture within which a first hinge housing pivot point and second hinge housing pivot point, each situated at the hinge housing, can translate. When the first device housing pivots about the hinge housing between the closed position and the axially displaced open position, the first hinge housing pivot point and the second hinge housing pivot point translate within the apertures of the first sliding link and the second sliding link, respectively, between a first location and a second location. In one or more embodiments, the first location is more centrally located within the first sliding link and the second sliding link than the second location. In one or more embodiments, when the first device housing pivots about the hinge housing relative to the second device housing to the axially displaced open position, the first hinge housing pivot point and the second hinge housing pivot point situate within the first location. By contrast, when the first device housing pivots about the hinge housing relative to the second device housing to the closed position, the first hinge housing pivot point and the second hinge housing pivot point situate at the second location.

By translating within the apertures, the displacement between the first device housing and the hinge housing, and the second device housing and the hinge housing, is changed. Effectively, the first device housing and second device housing get closer to the hinge housing when the electronic device is in the axially displaced open position and get farther away from the hinge housing when the electronic device is in the closed position. This will be shown in more detail in the figures below.

This change in displacement advantageously compensates for the distance in the bending length of the flexible display and the length of the mechanical support. This also eliminates the need for any spring-loaded plate or other tensioning mechanism to be included. Moreover, it allows ends of the flexible display to be fixedly coupled to the first device housing and second device housing, respectively, thereby providing a more rigid and stable feel for users interacting with the flexible display using touch input. Other advantages of embodiments of the disclosure will be explained below. Still others will be obvious to those of ordinary skill in the art having the benefit of this disclosure.

Turning now to FIG. 1, illustrated therein is one explanatory electronic device 100 configured in accordance with one or more embodiments of the disclosure. The electronic device 100 of FIG. 1 is a portable electronic device. For illustrative purposes, the electronic device 100 is shown as a smartphone. However, the electronic device 100 could be any number of other devices as well, including tablet computers, gaming devices, multimedia players, and so forth. Still other types of electronic devices can be configured in accordance with one or more embodiments of the disclosure as will be readily appreciated by those of ordinary skill in the art having the benefit of this disclosure.

The electronic device 100 includes a first device housing 102 and a second device housing 103. In one or more embodiments, a hinge 101 couples the first device housing 102 to the second device housing 103. In one or more embodiments, the first device housing 102 is selectively pivotable about the hinge 101 relative to the second device housing 103. For example, in one or more embodiments the first device housing 102 is selectively pivotable about the hinge 101 between a closed position, shown and described below with reference to FIG. 2, and an axially displaced open position, shown and described below with reference to FIGS. 4-5.

In one or more embodiments the first device housing 102 and the second device housing 103 are manufactured from a rigid material such as a rigid thermoplastic, metal, or composite material, although other materials can be used. Still other constructs will be obvious to those of ordinary skill in the art having the benefit of this disclosure. In the illustrative embodiment of FIG. 1, the electronic device 100 includes a single hinge. However, in other embodiments two or more hinges can be incorporated into the electronic device 100 to allow it to be folded in multiple locations.

This illustrative electronic device 100 of FIG. 1 includes a display 105. The display 105 can optionally be touch-sensitive. In one embodiment where the display 105 is touch-sensitive, the display 105 can serve as a primary user interface 118 of the electronic device 100. Users can deliver user input to the display 105 of such an embodiment by delivering touch input from a finger, stylus, or other objects disposed proximately with the display 105.

In one embodiment, the display 105 is configured as an organic light emitting diode (OLED) display fabricated on a flexible plastic substrate, thereby making the display 105 a flexible display 121. This allows the display 105 to be flexible so as to deform when the first device housing 102 pivots about the hinge 101 relative to the second device housing 103. However, it should be noted that other types of displays suitable for use with the electronic device 100 will be obvious to those of ordinary skill in the art having the benefit of this disclosure. Illustrating by example, as will be described in more detail with reference to FIG. 36 below, in other embodiments multiple displays can be used. For instance, a first rigid display can be coupled to the first device housing 102, while a second, separate rigid display can be coupled to the second device housing 103, with the hinge 101 separating the two displays.

Where a flexible display 121 is used, in one or more embodiments an OLED is constructed on flexible plastic substrates can allow the flexible display 121 to bend with various bending radii. For example, some embodiments allow bending radii of between thirty and six hundred millimeters. Other substrates allow bending radii of around five millimeters to provide a display that is foldable through active bending.

In one or more embodiments the flexible display 121 may be formed from multiple layers of flexible material such as flexible sheets of polymer or other materials. In this illustrative embodiment, the flexible display 121 is fixedly coupled to the first device housing 102 and the second device housing 103. The flexible display 121 spans the hinge 101 in this illustrative embodiment.

Features can be incorporated into the first device housing 102 and/or the second device housing 103. Examples of such features include a camera 106 or an optional speaker port 107, which are shown disposed on the rear side of the electronic device 100 in this embodiment but could be placed on the front side as well. In this illustrative embodiment, a user interface component 108, which may be a button or touch sensitive surface, can also be disposed along the rear side of the first device housing 102. As noted, any of these features are shown being disposed on the rear side of the electronic device 100 in this embodiment, but could be located elsewhere, such as on the front side in other embodiments. In other embodiments, these features may be omitted.

A block diagram schematic 110 of the electronic device 100 is also shown in FIG. 1. The block diagram schematic 110 can be configured as a printed circuit board assembly disposed within either or both of the first device housing 102 or the second device housing 103 of the electronic device 100. Various components can be electrically coupled together by conductors or a bus disposed along one or more printed circuit boards. For example, some components of the block diagram schematic 110 can be configured as a first electronic circuit fixedly situated within the first device housing 102, while other components of the block diagram schematic 110 can be configured as a second electronic circuit fixedly situated within the second device housing 103. As will be described in more detail below, a flexible substrate can then span the hinge 101 to electrically couple the first electronic circuit to the second electronic circuit.

In one or more embodiments, the electronic device 100 includes one or more processors 112. In one embodiment, the one or more processors 112 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the electronic device 100. Each of the application processor and the auxiliary processor(s) can be configured to process and execute executable software code to perform the various functions of the electronic device 100. A storage device, such as memory 113, can optionally store the executable software code used by the one or more processors 112 during operation.

In this illustrative embodiment, the electronic device 100 also includes a communication circuit 114 that can be configured for wired or wireless communication with one or more other devices or networks. The networks can include a wide area network, a local area network, and/or personal area network. The communication circuit 114 may also utilize wireless technology for communication, such as, but are not limited to, peer-to-peer or ad hoc communications such as HomeRF, Bluetooth and IEEE 802.11, and other forms of wireless communication such as infrared technology. The communication circuit 114 can include wireless communication circuitry, one of a receiver, a transmitter, or transceiver, and one or more antennas 115.

In one embodiment, the one or more processors 112 can be responsible for performing the primary functions of the electronic device 100. For example, in one embodiment the one or more processors 112 comprise one or more circuits operable with one or more user interface devices, which can include the display 105, to present, images, video, or other presentation information to a user. The executable software code used by the one or more processors 112 can be configured as one or more modules 116 that are operable with the one or more processors 112. Such modules 116 can store instructions, control algorithms, logic steps, and so forth.

In one embodiment, the one or more processors 112 are responsible for running the operating system environment of the electronic device 100. The operating system environment can include a kernel and one or more drivers, and an application service layer, and an application layer. The operating system environment can be configured as executable code operating on one or more processors or control circuits of the electronic device 100. The application layer can be responsible for executing application service modules. The application service modules may support one or more applications or "apps." The applications of the application layer can be configured as clients of the application service layer to communicate with services through application program interfaces (APIs), messages, events, or other inter-process communication interfaces. Where auxiliary processors are used, they can be used to execute input/output functions, actuate user feedback devices, and so forth.

Figure 2:
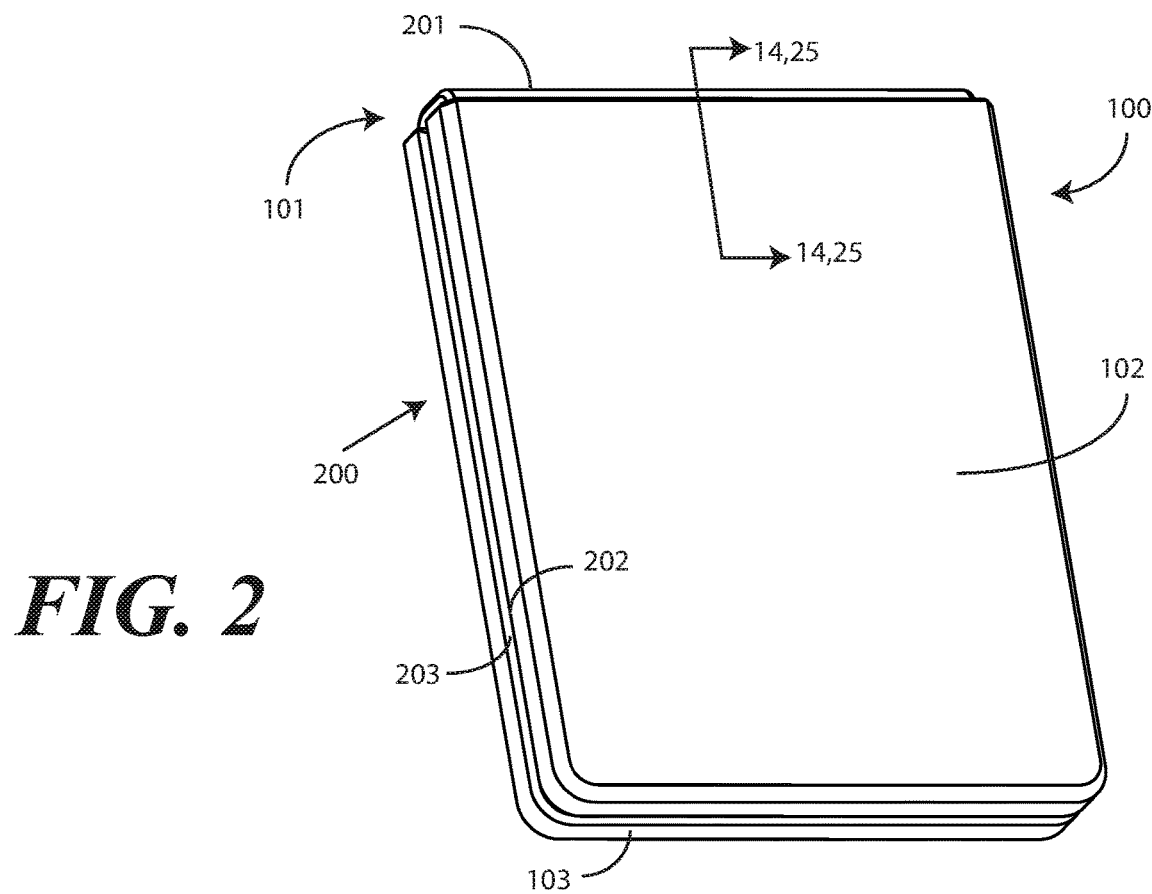
FIG. 2 illustrates a perspective view of one explanatory electronic device in accordance with one or more embodiments of the disclosure in a closed position.
Figure 3:
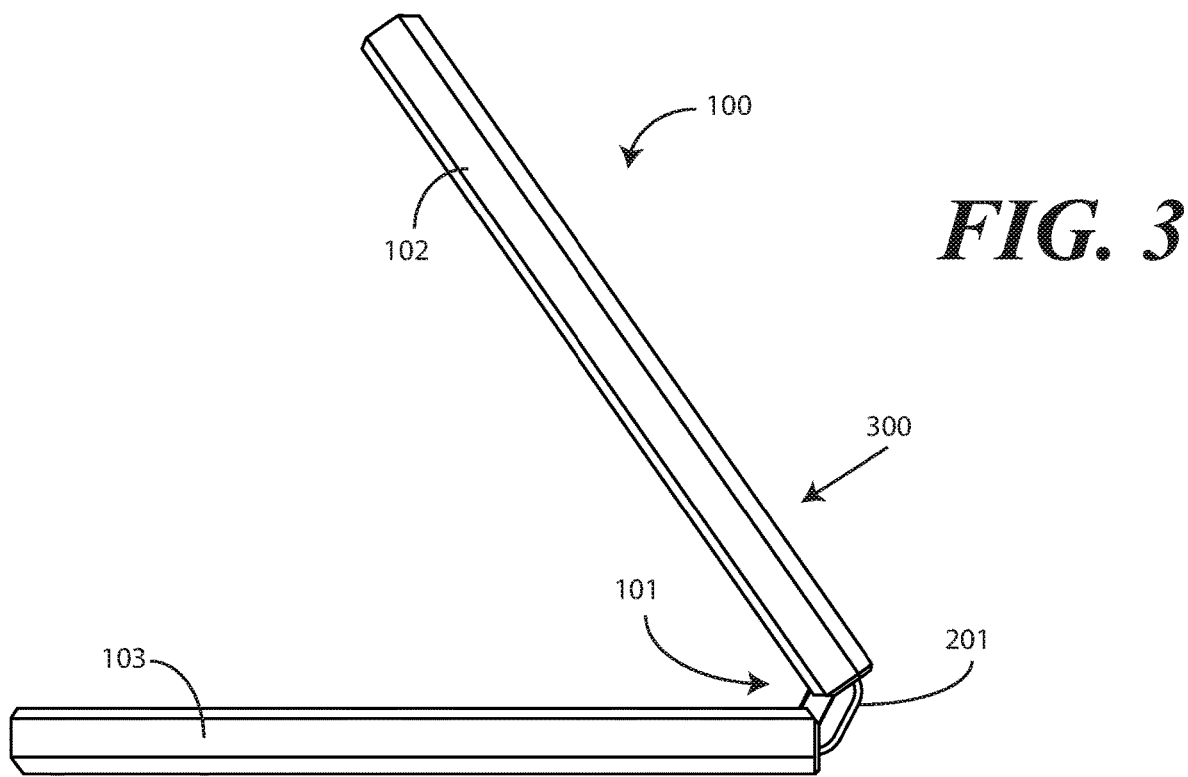
FIG. 3 illustrates a side elevation view of one explanatory electronic device in accordance with one or more embodiments of the disclosure in a partially open position.

In one embodiment, the electronic device 100 optionally includes one or more flex sensors 117, operable with the one or more processors 112, to detect a bending operation that causes the first device housing 102 to pivot about the hinge 101 relative to the second device housing 103, thereby transforming the electronic device 100 into a deformed geometry, such as that shown in FIGS. 2-3. The inclusion of flex sensors 117 is optional, and in some embodiment flex sensors 117 will not be included.

In one embodiment, the one or more processors 112 may generate commands or execute control operations based on information received from the various sensors, including the one or more flex sensors 117, the user interface 118, or the other sensors 119. The one or more processors 112 may also generate commands or execute control operations based upon information received from a combination of the one or more flex sensors 117, the user interface 118, or the other sensors 119. Alternatively, the one or more processors 112 can generate commands or execute control operations based upon information received from the one or more flex sensors 117 or the user interface 118 alone. Moreover, the one or more processors 112 may process the received information alone or in combination with other data, such as the information stored in the memory 113.

The one or more other sensors 119 may include a microphone, an earpiece speaker, a second loudspeaker (disposed beneath speaker port 107), and a user interface component such as a button or touch-sensitive surface. The one or more other sensors 119 may also include key selection sensors, proximity sensors, a touch pad sensor, a touch screen sensor, a capacitive touch sensor, and one or more switches. Touch sensors may used to indicate whether any of the user actuation targets present on the display 105 are being actuated. Alternatively, touch sensors disposed in the electronic device 100 can be used to determine whether the electronic device 100 is being touched at side edges or major faces of the first device housing 102 or the second device housing 103. The touch sensors can include surface and/or housing capacitive sensors in one embodiment. The other sensors 119 can also include audio sensors and video sensors (such as a camera).

The other sensors 119 can also include motion detectors, such as one or more accelerometers or gyroscopes. For example, an accelerometer may be embedded in the electronic circuitry of the electronic device 100 to show vertical orientation, constant tilt and/or whether the electronic device 100 is stationary. The measurement of tilt relative to gravity is referred to as "static acceleration," while the measurement of motion and/or vibration is referred to as "dynamic acceleration." A gyroscope can be used in a similar fashion.

Other components 120 operable with the one or more processors 112 can include output components such as video outputs, audio outputs, and/or mechanical outputs. Examples of output components include audio outputs such as speaker port 107, earpiece speaker, or other alarms and/or buzzers and/or a mechanical output component such as vibrating or motion-based mechanisms. Still other components will be obvious to those of ordinary skill in the art having the benefit of this disclosure.

It is to be understood that FIG. 1 is provided for illustrative purposes only and for illustrating components of one electronic device 100 in accordance with embodiments of the disclosure and is not intended to be a complete schematic diagram of the various components required for an electronic device. Therefore, other electronic devices in accordance with embodiments of the disclosure may include various other components not shown in FIG. 1 or may include a combination of two or more components or a division of a particular component into two or more separate components, and still be within the scope of the present disclosure. Illustrating by example, the electronic device 100 of FIG. 1 includes a single flexible display 105. By contrast, another embodiment shown below in FIG. 36 includes two separate and distinct displays, and so forth. Additionally, as will be described in more detail below, some embodiments include support plates that are pivotally coupled to a hinge housing of the hinge 101. In other embodiments, these support plates will be omitted.

Turning now to FIG. 2, illustrated therein is the electronic device 100 in a closed state. In this state, the first device housing 102 has been pivoted about the hinge 101 toward the second device housing 103 to a closed position 200. When in the closed position 200, a front surface 202 of the first device housing 102 abuts a front surface 203 of the second device housing 103. Additionally, in this illustrative embodiment, a hinge housing 201 comprising the hinge 101 is revealed when the electronic device 100 is in the closed position 200. In other embodiments, the hinge housing 201 will remain concealed when the first device housing 102 pivots about the hinge 101 relative to the second device housing 103 to the closed position 200. Effectively, in either embodiment, the first device housing 102 and the second device housing 103 are analogous to clam shells that have been shut by the claim, thereby giving rise to the "clamshell" style of device. When the clam shells open, the flexible display (121) is revealed.

In some embodiments, features can be included to further retain the electronic device 100 in the closed position 200. Illustrating by example, in another embodiment, a mechanical latch can be included to retain the first device housing 102 and the second device housing 103 in the closed position 200.

In still another embodiment, magnets can be incorporated into the front surface 202 of the first device housing 102 and the front surface 203 of the second device housing 103. For instance, magnets can be placed in the first device housing 102 and the second device housing 103 to retain the first device housing 102 and the second device housing 103 in the closed position 200.

In still other embodiments, frictional elements can be incorporated into the hinge 101 to retain the first device housing 102 and the second device housing 103 in a particular position. A stator motor could be integrated into the hinge 101 as well. Still other mechanical structures and devices suitable for retaining the electronic device 100 in the closed position 200 will be obvious to those of ordinary skill in the art having the benefit of this disclosure. As will be described below with reference to FIGS. 13 and 24, in other embodiments retention devices can be omitted due to the fact that torsion springs used in combination with a cam having mechanical detents and a stator with mechanical protrusions are used.

Turning now to FIG. 3, the electronic device 100 is shown being transitioned from the closed position (200) of FIG. 2 to a partially open position 300. Specifically, the first device housing 102 is pivoting about the hinge 101 away from the second device housing 103 toward an open position. The open position 300 shown in FIG. 3 is a "tent position." In the side elevation view of FIG. 3, the hinge housing 201 is exposed between the first device housing 102 and the second device housing 103.

Figures 4, 5:
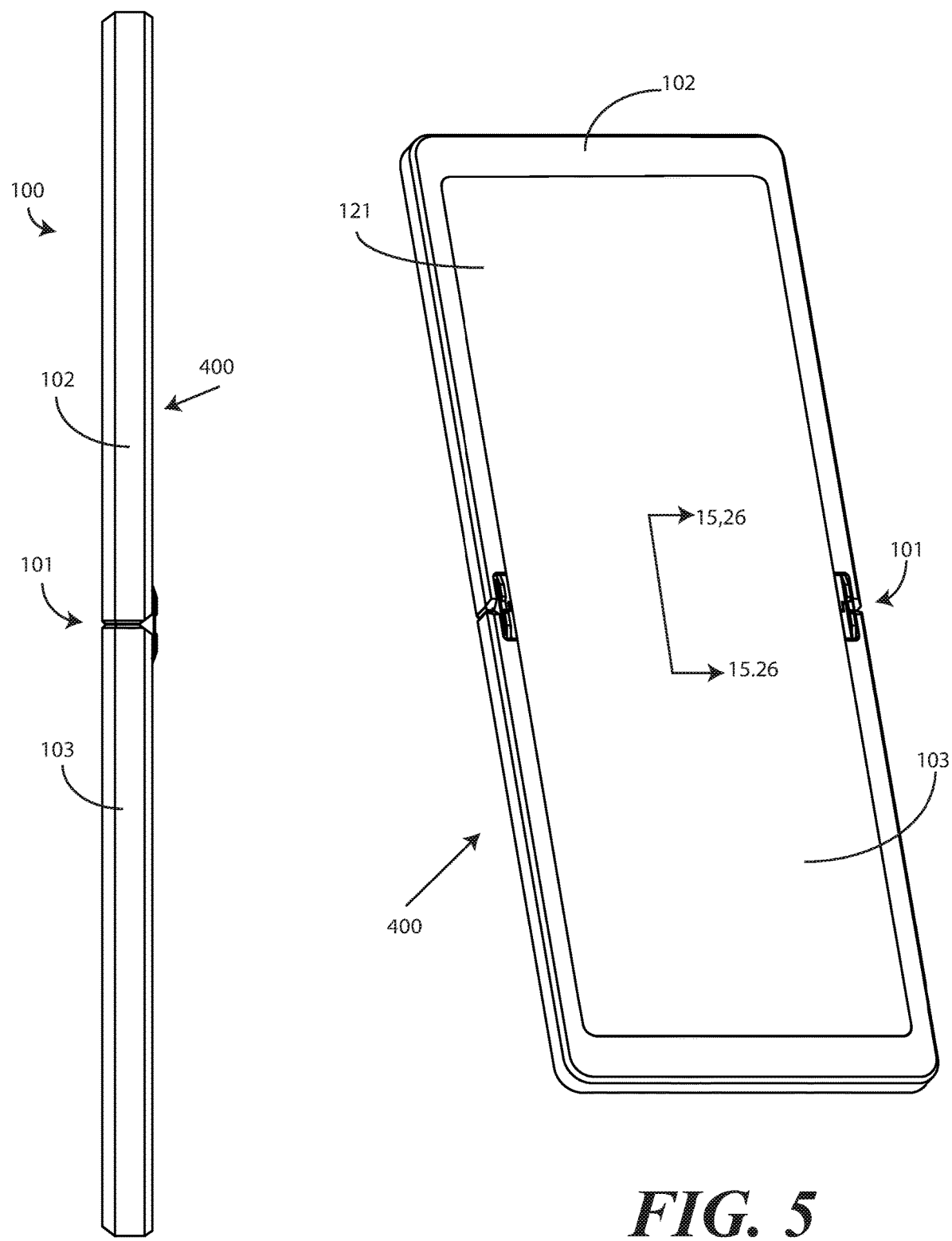
FIG. 4 illustrates a side elevation view of one explanatory electronic device in accordance with one or more embodiments of the disclosure in an axially displaced open position.
FIG. 5 illustrates a perspective view of one explanatory electronic device in accordance with one or more embodiments of the disclosure in the axially displaced open position.

Turning now to FIGS. 4 and 5, illustrated therein is the electronic device 100 in an axially displaced open position 400. In the axially displaced open position 400, the first device housing 102 is rotated about the hinge 101 so as to be axially displaced 180-degrees out of phase with the second device housing 103, thereby revealing the flexible display 121 of this embodiment. In this illustrative embodiment, this causes the hinge housing (201) to be concealed within the first device housing 102 and second device housing 103.

In such a configuration, the first device housing 102 and the second device housing 103 effectively define a plane. Since this illustrative embodiment includes a flexible display 121, the flexible display 121 has been elongated into a flat position.

Figure 6:
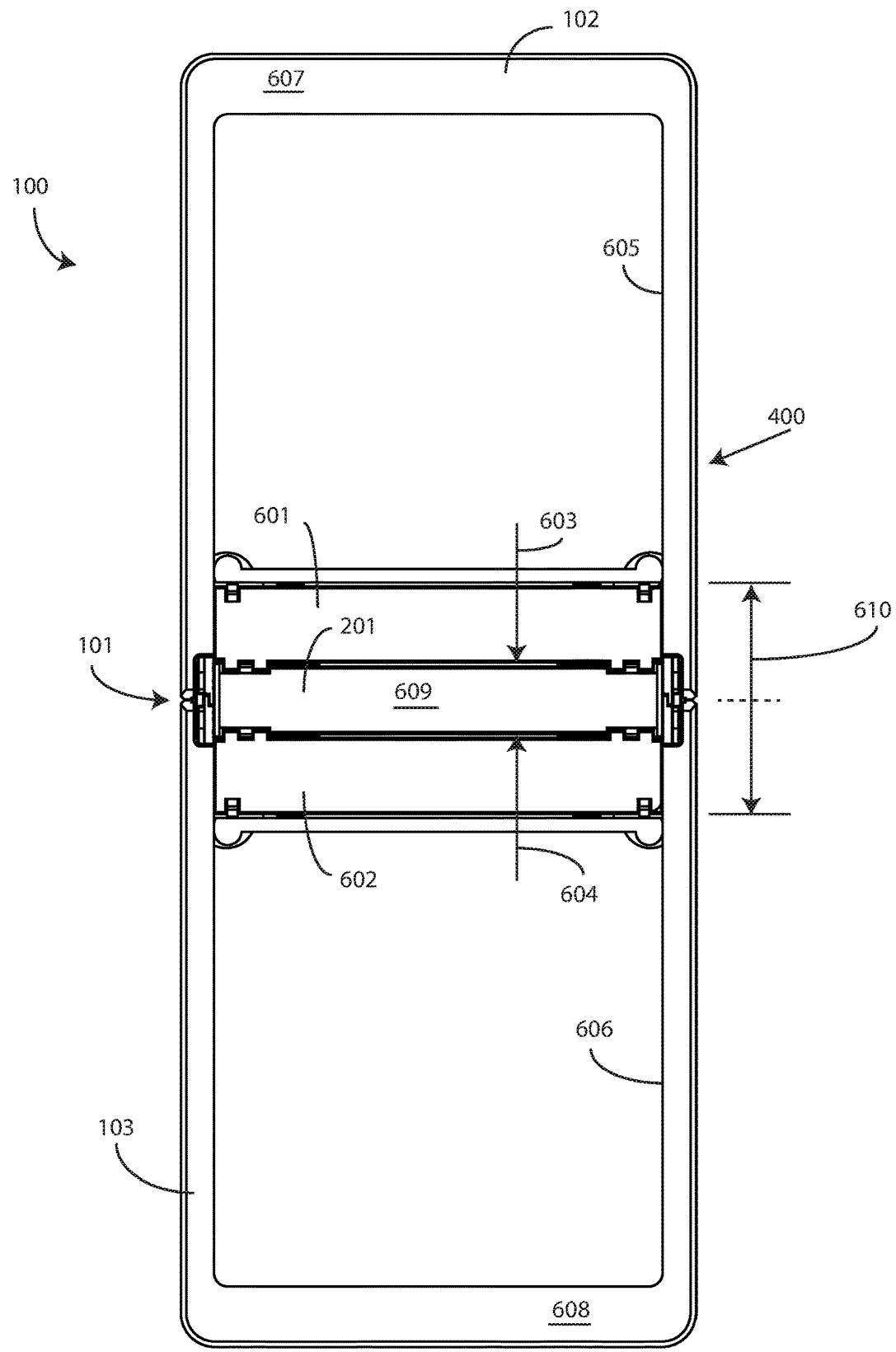
FIG. 6 illustrates a plan view of one explanatory electronic device in accordance with embodiments of the disclosure with the flexible display removed so that the hinge is visible.

Turning now to FIG. 6, the electronic device 100 is shown with the flexible display (121), as well as any overlaying fascia, removed so that additional details of the hinge 101 can more readily be seen. As shown in FIG. 6, in one or more embodiments the hinge 101 includes a hinge housing 201, which can link the first device housing 102 to the second device housing 103. The hinge 101 of the hinge housing 201 can further include one or more pivots allowing the first device housing 102 to pivot about the hinge 101, which is operatively coupled to the hinge housing 201, relative to the second device housing 103.

Optionally, as will be described in more detail below, one or more support plates can be included to translate within the first device housing 102 and the second device housing 103, respectively. The use of such support plates is advantageous when the flexible display 121 used in the electronic device 100. However, where rigid displays are used, such as in the embodiment of FIG. 10, the support plates can be omitted.

In this illustrative embodiment, a first support plate 601 is pivotally coupled to a first side 603 of the hinge housing 201. The first support plate 601 extends distally into the first device housing 102 from the first side 603 of the hinge housing 201. A second support plate 602 is then pivotally coupled to a second side 604 of the hinge housing 201. The second support plate 602 then extends distally into the second device housing 103 from the second side 604 of the hinge housing 201.

In one or more embodiments, the first device housing 102 and the second device housing 103 each define linear recesses 605,606 into which a display (105)—be it a flexible display (121) or rigid display—may be positioned. In one or more embodiments where a flexible display (121) is used, the flexible display (121) is positioned within the linear recess 605 of the first device housing 102 and the linear recess 606 of the second device housing 103 so that it—or a fascia disposed atop the flexible display (121)—sits flush with the interior surface 607 of the first device housing 102 and the interior surface 608 of the second device housing 103. Where a flexible display (121) is used, the flexible display (121) will span the hinge 101 by passing across the hinge housing 201 in such an embodiment.

By contrast, where two displays are used (as shown below in FIG. 36), a first display can be positioned within the linear recess 605 of the first device housing 102. A second display can then be positioned in the linear recess 606 of the second device housing 103. This allows each display—or a fascia disposed atop each display—to sit flush with the interior surface 607 of the first device housing 102 and the interior surface 608 of the second device housing 103. Where two displays are used, the hinge 101 and hinge housing 201 will separate one display from the other. The hinge housing 201 of such an embodiment can be made narrower than that shown in FIG. 6 due to the fact that it need not provide mechanical support for a display as is the case when the display is a flexible display (121).

In still other embodiments, the linear recess 605,606 will be omitted. The display(s), whether flexible or not, as well as any accompanying fascia, may then simply sit atop planar surfaces defined by the interior surface 607 of the first device housing 102 and the interior surface 608 of the second device housing 103.

Where the linear recesses 605,606 are included and a flexible display (121) is used, the flexible display (121) can be positioned within these linear recesses 605,606 to span the hinge 101 and hinge housing 201. Regardless of whether the linear recesses 605,606 are included, when the first device housing 102 pivots about the hinge 101 and hinge housing 201 relative to the second device housing 103 to the axially displaced open position 400 shown in FIG. 6, the first support plate 601, the hinge housing 201, and the second support plate 602 bridge the linear recesses 605,606 (or planar interior surfaces in the other embodiment) to provide positive mechanical support for the flexible display (121).

Where electrical components, e.g., processors, memories, communication circuits, and other components described in the block diagram schematic (110) of FIG. 1 are positioned in each of the first device housing 102 and the second device housing 103, a flexible substrate can be included to electrically couple these components together across the hinge 101 and through the hinge housing 201. Illustrating by example, as will be shown below in FIGS. 14-15 and 25-26, in one or more embodiments the hinge housing 201 can include a crescent shaped duct through which the flexible substrate can pass. In one or more embodiments, the flexible substrate, which can bend as the first device housing 102 and the second device housing 103 pivot about the hinge 101 to the closed position (200) of FIG. 2, allows electrical signals to pass back and forth between circuit components disposed in the first device housing 102 and the second device housing 103.

In one or more embodiments, one or more spring-loaded trays can be included within one or both of the first device housing 102 or the second device housing 103. Illustrating by example, a spring-loaded and slidable tray can be disposed within the first device housing 102. One example of such a solution is described in commonly assigned U.S. Pat. No. 10,491,725 to Harmon et al., entitled "Hinged Electronic Device with Moving Support Plates for a Flexible Display and Corresponding Systems," which is incorporated herein by reference. Alternatively, the tray could be disposed in the second device housing 103. Additionally, in other embodiments both the first device housing 102 and the second device housing 103 could include trays as well.

In one or more embodiments, a first end of a flexible display (121) can be fixedly coupled to the second device housing 103. The second end of the flexible display (121) can then be coupled to the sliding tray. In one or more embodiments, the tray is slidably coupled to the first device housing 102 and is biased away from the hinge 101 and hinge housing 201 by a spring. It should be noted that while a spring is used to bias the tray away from the hinge 101 and hinge housing 201 in some embodiments, in other embodiments the spring can be replaced by a damper device or other equivalent. Where configured as a damper device, the damper device can include a spring with a nested shock damper, which can be pneumatic or hydraulic, to dampen the action of the spring. Other devices suitable for use instead of the spring will be obvious to those of ordinary skill in the art having the benefit of this disclosure.

Where a tray is included, the spring(s) can operably bias the tray away from the hinge 101 to flatten the flexible display (121) when the first device housing 102 pivots about the hinge 101 away from the second device housing 103 to the open position 400. A first end of the flexible display (121) can be coupled to the second device housing 103, while a second end is coupled to the tray. In one or more embodiments, the spring biases the tray away from the hinge 101, and thus away from the second device housing 103, to remove slack from the flexible display (121) when the first device housing 102 is pivoted about the hinge 101 toward the second device housing 103 to the closed position (200) of FIG. 2.

While inclusion of a spring-loaded tray works well in practice, experimental testing has shown that the inclusion of a tray, with one end of the display (105) coupled thereto, can cause a flexible display (121) to "feel" like its moving when a user is delivering user input to the flexible display (121). To eliminate this tactile artifact, and to provide for more display stability when a user is interacting with the flexible display (121) with a finger or stylus, in the illustrative embodiment of FIG. 6 the hinge 101 is configured to alter a displacement 610 between the hinge housing 201 and the first device housing 102 and second device housing 103, respectively, when the first device housing 102 and the second device housing 103 pivot about the hinge housing 201 between the axially displaced open position 400 of FIG. 6 and the closed position (200) of FIG. 2. Advantageously, this changing of the displacement 610 eliminates the need for any spring-loaded tray, as it allows the flexible display (121) to be fixedly coupled to the first device housing 102 and the second device housing 103, respectively. Moreover, the flexible display 121 is able to fully extend when the electronic device 100 is in the axially displaced open position 400 of FIG. 6, while still forming a proper service loop (shown, for example in FIG. 9 below) when the electronic device 100 is in the closed position (200).

Effectively, the hinge 101 of FIG. 6 causes the hinge housing 201 to get closer to the interior ends of the first device housing 102 and second device housing 103, respectively, when the electronic device 100 is in the axially displaced open position 400, while moving the hinge housing 201 farther from these interior ends of the first device housing 102 and second device housing 103, respectively, when the electronic device 100 is in the closed position (200). This changing distance, represented by displacement 610 in FIG. 6, compensates for the difference between the length of the flexible display (121) that bends when the first device housing 102 pivots about the hinge 101 relative to the second device housing 103 to the closed position (200) and the length of the mechanical mechanism supporting the flexible display (121) that is defined by the first support plate 601, the second support plate 602, and the hinge housing 201. This change in displacement 610 causes an interior surface 609 of the hinge housing 201 to be positioned farther from the first device housing 102 and the second device housing 103, respectively, when the first device housing 102 is pivoted about the hinge housing 201 relative to the second device housing 103 to the closed position (200) than when the first device housing 102 is pivoted about the hinge housing 201 relative to the second device housing 103 to the axially displaced open position 400. How this occurs will be illustrated in more detail below with reference to FIGS. 16-18 and 27-29.

Figure 7:
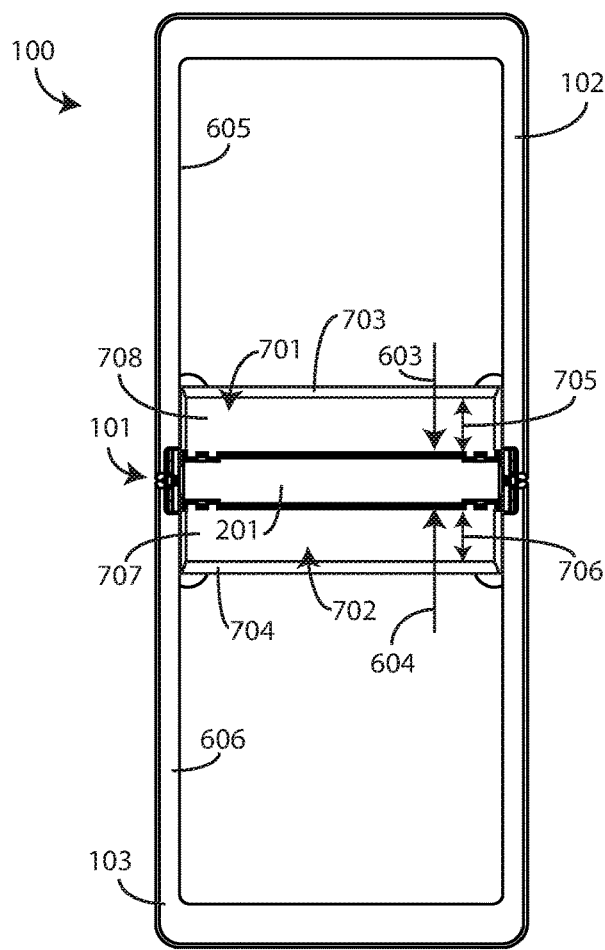
FIG. 7 illustrates a perspective view of one explanatory electronic device in accordance with embodiments of the disclosure with the flexible display removed so that the hinge is visible.

Turning now to FIG. 7, illustrated therein is another view of the electronic device 100 is shown with the first support plate (601) and the second support plate (602) removed so that additional details of the first device housing 102 and the second device housing 103 can more readily be seen. As shown in FIG. 7, in one or more embodiments each of the first device housing 102 and the second device housing 103 define a first chamber 701 and a second chamber 702, respectively.

In this illustrative embodiment, the first chamber 701 of the first device housing 102 is disposed to a first side 603 of the hinge housing 201, while the second chamber 702 of the second device housing 103 is disposed to the second side 604 of the hinge housing 201. The hinge housing 201 then separates the first chamber 701 defined by the first device housing 102 from the second chamber 702 defined by the second device housing 103.

In one or more embodiments, the first chamber 701 and the second chamber 702 provide recessed, open space within the first device housing 102 and the second device housing 103, respectively, that allows the flexible display (121) room to form a service loop when the first device housing 102 and the second device housing 103 pivot about the hinge 101 to the closed position (200). One example of such a service loop will be shown below with reference to FIG. 9. This service loop occurs due to the fact that the flexible display (121) deforms when the first device housing 102 pivots about the hinge 101 relative to the second device housing 103 from the axially displaced open position 400 to the closed position (200).

In one or more embodiments, each of the first chamber 701 and the second chamber 702 comprises an inclined plane 703,704. In this illustrative embodiment, the first chamber 701 defines an inclined plane 703 that is disposed distally a predefined distance 705 across a bottom surface 707 of the first chamber 701 from the hinge housing 201. Similarly, the second chamber 702 defines an inclined plane 704 that is disposed distally a predefined distance 706 across a bottom surface 708 of the second chamber 702 from the hinge housing 201.

In this illustrative embodiment, the first device housing 102 and the second device housing 103 each define linear recesses 605,606 into which a display (105) may be positioned. In such an embodiment, each of the first chamber 701 and the second chamber 702 is disposed between a respective linear recess 605,606 and the hinge 101. For example, in this illustrative embodiment the first chamber 701 of the first device housing 102 is disposed between the linear recess 605 of the first device housing 102 and the hinge 101. Similarly, the second chamber 702 of the second device housing 103 is disposed between the linear recess 606 of the second device housing 103 and the hinge 101.

While shown as flat surfaces spanning the width of the first chamber 701 and the second chamber 702, respectively, in FIG. 7, it should be noted that the inclined planes 703,704 could be augmented with, or replaced by, other inclined plane structures. Illustrating by example, turning now to FIG. 8, in this illustrative embodiment each of the first support plate 601 and the second support plate 602 is bounded by inclined apertures 801,802,803,804 within which posts extending distally from the edges of the first support plate 601 and second support plate 602 insert. This configuration latches and retains the posts within the inclined apertures 801,802,803,804, thereby defining an enclosed track within which the posts may travel as the electronic device 100 pivots between the axially displaced open position (400) and the closed position (200).

Figure 8:
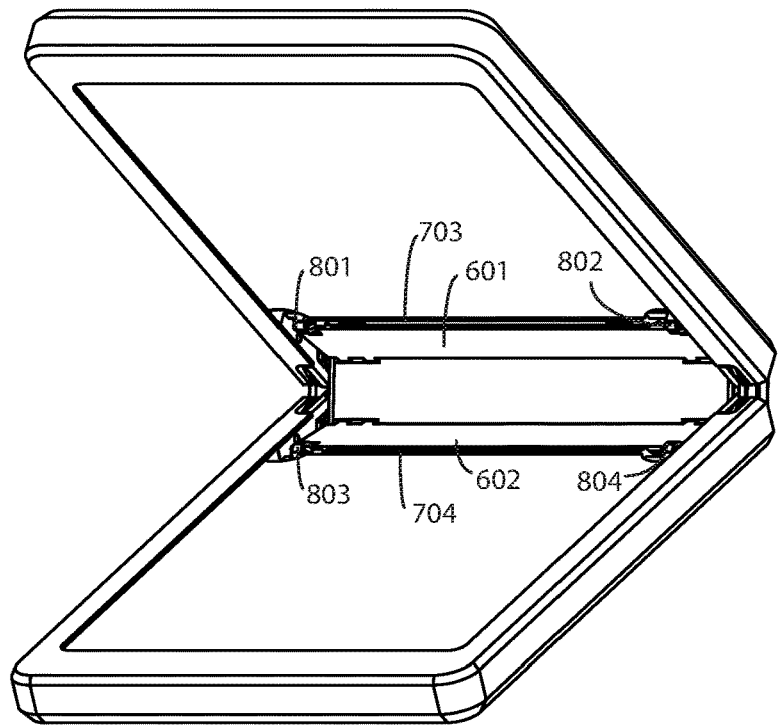
FIG. 8 illustrates a perspective view of one explanatory electronic device in accordance with embodiments of the disclosure in a partially open position, and with the flexible display removed so that the hinge is visible.

In the illustrative embodiment of FIG. 8, the inclined apertures 801,802,803,804 are included in addition to the inclined planes 703,704. However, in other embodiments the inclined apertures 801,802,803,804 will be omitted. In still other embodiments, the inclined apertures 801,802,803,804 will replace the inclined planes 703,704. The operation of the inclined apertures 801,802,803,804 will be more clearly illustrated below in FIGS. 16-18 and 27-28.

Figure 9:
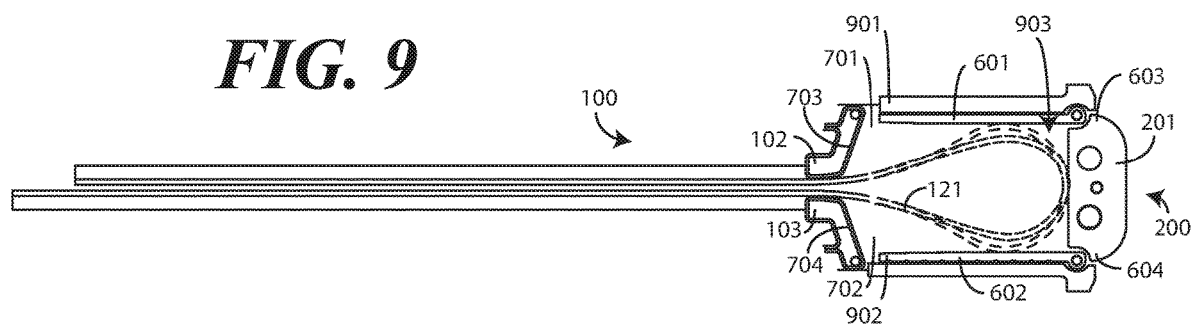
FIG. 9 illustrates a cut away view of a hinge portion of an electronic device in accordance with one or more embodiments of the disclosure when the electronic device is in the closed position.

Turning now to FIG. 9, illustrated therein is a partial cut away view of the electronic device 100 showing the mechanical mechanism facilitating support of the flexible display 121 during bending operations. In this illustration, the flexible display 121 is positioned within the first chamber 701 and second chamber 702 of the first device housing 102 and the second device housing 103, respectively. As shown, the first device housing 102 defines the first chamber 701, while the second device housing 103 defines the second chamber 702.

As shown in FIG. 9, the first device housing 102 and the second device housing 103 have been pivoted about the hinge housing 201 to the closed position 200. In one or more embodiments, when this occurs, a distal end 901,902 of each of the first support plate 601 and the second support plate 602 travels along its respective inclined plane 703,704 between a first position (shown in FIG. 10) within the first device housing 102 and the second device housing 103, respectively, to a second position (shown in FIG. 9) within the first device housing 102 and the second device housing 103, respectively.

Figure 10:
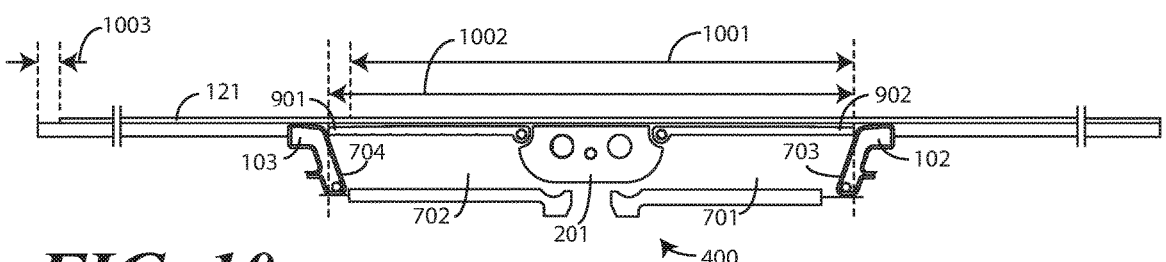
FIG. 10 illustrates a cut away view of a hinge portion of an electronic device in accordance with one or more embodiments of the disclosure when the electronic device is in the axially displaced open position.

The distal ends 901,902 of each of the first support plate 601 and the second support plate 602 therefore travel, in one or more embodiments, along their respective inclined planes 703,704 through the first chamber 701 and the second chamber 702 between the first position of FIG. 10 within the first device housing 102 and the second device housing 103, respectively, to the second position of FIG. 9 within the first device housing 102 and the second device housing 103, respectively, when the first device housing 102 and the second device housing 103 pivot about the hinge housing 201 from an axially displaced open position (400) to the closed position 200 of FIG. 9. When this occurs, the first support plate 601, the hinge housing 201, and the second support plate 602 define boundaries within which the flexible display 121 defines a service loop 903.

The area opened for the service loop 903 by the translation of the first support plate 601 and the second support plate 602, in one embodiment, provides a radius that is sufficient to prevent the flexible display 121 from kinking or folding. The opened area also works to minimize mechanical memory problems when the first device housing 102 and the second device housing 103 pivot about the hinge housing 201 to the open position (400).

As described above, the first support plate 601 is pivotally coupled to a first side 603 of the hinge housing 201. The first support plate 601 extends distally into the first chamber 701 from the first side 603 of the hinge housing 201. Similarly, the second support plate 602 is pivotally coupled to a second side 604 of the hinge housing 201. The second support plate 602 extends distally into the second chamber 702 from the second side 604 of the hinge housing 201. The distal end 901 of the first support plate 601 and the distal end 902 of the second support plate 602 each travel along its respective inclined plane 703,704 between a first position within the first chamber 701 and the second chamber 702, respectively, as shown in FIG. 10, to a second position within the first chamber 701 and the second chamber 702, respectively, as shown in FIG. 9, when the first device housing 102 and the second device housing 103 pivot about the hinge housing 201 from the axially displaced open position (400) to the closed position 200.

The translation of the first support plate 601 and the second support plate 602 along the inclined planes 703,704 from a shallow position (FIG. 10) within the first device housing 102 and the second device housing 103, to the deep position within the first device housing 102 and the second device housing 103 shown in FIG. 9, when the first device housing 102 pivots about the hinge housing 201 relative to the second device housing 103 from the axially displaced open position (400) to the closed position 200, results in the first support plate 601 and the second support plate 602 abutting the outer major face of the flexible display 121 when the first device housing 102 and the second device housing 103 are in the closed position 200.

Turning now to FIG. 10, the first device housing 102 and the second device housing 103 have been rotated about the hinge housing 201 to the axially displaced open position 400. When this occurs, due to the action of the hinge housing 201, the distal ends 901,902 of the first support plate 601 and the second support plate 602 translate up their respective inclined planes 703,704, through the first chamber 701 and the second chamber 702, from the second position of FIG. 9 to the first position shown in FIG. 10. In the illustrative embodiment of FIG. 10, when the distal ends 901,902 of the first support plate 601 and the second support plate 602 fully translate up their respective inclined planes 703,704 from the second position of FIG. 9 to the first position shown in FIG. 10, they sit atop ends of the inclined planes 703,704.

In this position, and as shown in FIG. 10, when the distal ends 901,902 of the first support plate 601 and the second support plate 602 fully translate up their respective inclined planes 703,704 from the second position of FIG. 9 to the first position shown in FIG. 10, the first support plate 601, the hinge housing 201, and the second support plate 602 bridge the linear recess (605) of the first device housing 102 and the linear recess (606) of the second device housing 103 when the first device housing 102 and the second device housing 103 are in an axially displaced open position 400 shown in FIG. 10. Since the distal ends 901,902 of the first support plate 601 and the second support plate 602 have translated up their respective inclined planes 703,704 from the second position of FIG. 9 to the first position shown in FIG. 10, the first support plate 601, the second support plate 602, and the hinge housing 201 work in tandem to mechanically support the flexible display 121.

By comparing FIGS. 9 and 10, it can be seen that when the flexible display 121 is fixedly coupled to the first device housing 102 and also fixedly coupled to the second device housing 103, with the first device housing 102, hinge housing 201, and second device housing 103 configured to cause the flexible display 121 to extend and become substantially planar when the first device housing 102 and second device housing 103 are in the axially displaced open position 400, the path length 1002 of the mechanical mechanism defined by the first support plate 601, the second support plate 602, and the hinge housing 201 can be different than the path length 1001 of the section of the flexible display 121 that bends when each is in the closed position 200. Said differently, where the flexible display 121 is configured to extend flat when in the axially displaced open position 400, when the folding mechanism is in the closed position 200 the length 1001 of the service loop 903 defined by the flexible display 121 and the mechanical boundaries defined by the first support plate 601, hinge housing 201, and second support plate 602 may be different.

In particular, to provide sufficient room for the service loop 903, the mechanical mechanism defined by the first support plate 601, the hinge housing 201, and the second support plate 602 may be longer than the length 1001 of the flexible display 121 that bends to define the service loop 903 by a predefined amount. This difference 1003 in length can be problematic in that it can result in either deformations in the service loop 903 when the mechanism is in the closed position 200, or alternatively it can result in mechanical strain or unevenness in the flexible display 121 when the mechanism is in the axially displaced open position 400.

Figure 11:
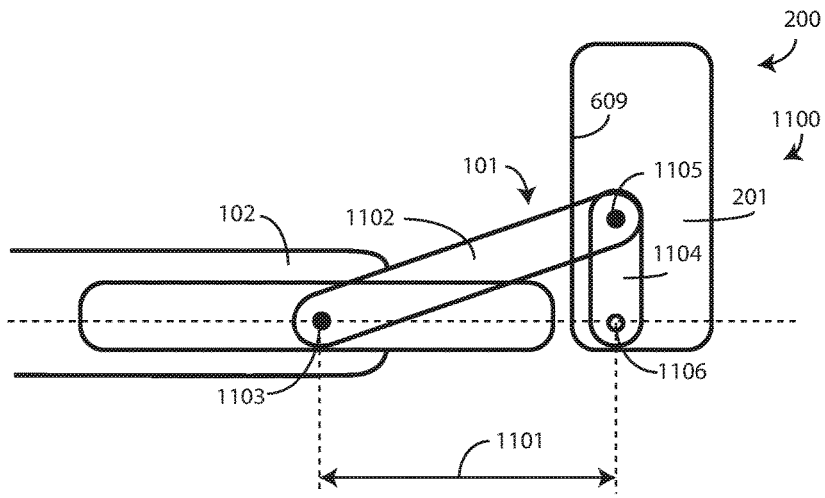
FIG. 11 illustrates a portion of one explanatory hinge mechanism in accordance with one or more embodiments of the disclosure when the hinge mechanism is in the closed position.
Figure 12:
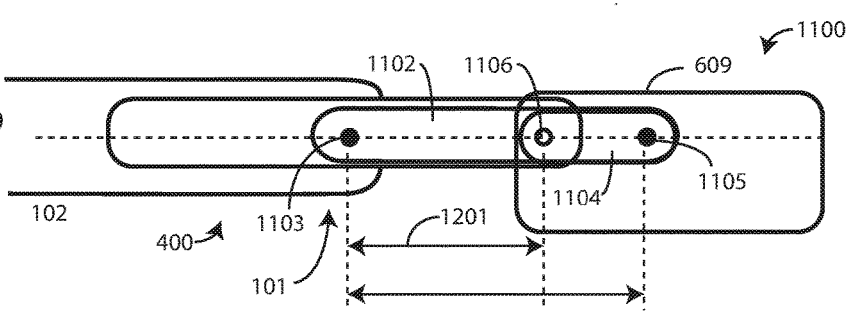
FIG. 12 illustrates the portion of the explanatory hinge mechanism of FIG. 11 in the axially displaced open position.

While a spring-loaded plate can be used to apply tension to one end of the flexible display to compensate for the distance difference 1003 as noted above, embodiments of the disclosure provide an improved hinge mechanism that allows for the flexible display 121 to be fixedly connected to the first device housing 102 and second device housing 103, respectively, as well as to fully extend when the mechanism is in the axially displaced open position 400. At the same time, the hinge mechanism allows the flexible display 121 form a proper service loop 903 when the mechanism is in the closed position 200. FIGS. 11-12 generally illustrate a first example of such a hinge mechanism, while FIGS. 22-23 generally illustrate a second example of such a hinge mechanism. More detailed implementations of these general examples are illustrated in FIGS. 13-21 and FIGS. 24-32.

Embodiments of the disclosure accomplish this by employing a hinge mechanism that changes a displacement (610) between the hinge housing 201 and the first device housing 102 and second device housing 103, respectively, as the first device housing 102 and second device housing 103 pivot about the hinge housing 201 between the axially displaced open position 400 and the closed position 200. Effectively, hinges configured in accordance with embodiments of the disclosure cause the hinge housing 201 to get closer to the first device housing 102 and second device housing 103, respectively, when the electronic device is in the axially displaced open position 400, and farther from the hinge housing 201 when the electronic device is in the closed position 200. This changing distance compensates for the difference between the bending length 1001 of the flexible display 121 and the length 1002 of the mechanical mechanism supporting the flexible display 121.

Turning now to FIGS. 11-12, illustrated therein is a general mechanical schematic illustrating one explanatory way this can be accomplished. Shown in FIGS. 11-12 is a hinge mechanism 1100 configured to change a displacement 1101,1201 between the hinge housing 201 and the first device housing 102 and second device housing (103), respectively, when the first device housing 102 and the second device housing (103) pivot about the hinge housing 201 between the axially displaced open position 400 and the closed position 200. It should be noted that for simplicity only half of the hinge mechanism 1100 is shown in FIG. 11. For example, the first device housing 102 is shown, while the second device housing (103) is not. In practice, a mirror image of the components other than the hinge housing 201 would appear at the top of the hinge housing 201 as well in FIG. 11. The same is true with reference to FIG. 12—in practice, a mirror image of the components other than the hinge housing 201 would appear on the right side of the hinge housing 201, and so forth. Those of ordinary skill in the art having the benefit of this disclosure will readily recognize how, for example, the second device housing (103) couples to the hinge mechanism 1100 in view of the half mirror image shown in FIGS. 11-12.

In one or more embodiments, the hinge housing 201 comprises a hinge 101 that couples a first device housing 102 of an electronic device to a second device housing (103) such that the first device housing 102 is pivotable about the hinge housing 201 relative to the second device housing (103) between a closed position 200 and an axially displaced open position 400. In one or more embodiments, the hinge 101 changes a displacement 1101,1201 between the first device housing 102 and the second device housing (103), respectively, when the first device housing 102 and the second device housing (103) pivot about the hinge housing 201 between the axially displaced open position 400 and the closed position 200. This allows an interior surface 609 of the hinge housing 201 to be positioned farther from the first device housing 102 and the second device housing (103), respectively, when the first device housing 102 is pivoted about the hinge housing 201 relative to the second device housing (103) to the closed position 200 than when the first device housing 102 is pivoted about the hinge housing 201 relative to the second device housing (103) to the axially displaced open position 400.

In one or more embodiments, a first sliding link 1102 couples the hinge 101 to the first device housing 102 at a first pivot point 1103. In a mirror image of that shown in FIG. 11, a second sliding link then couples the hinge 101 to the second device housing (103) at a second pivot point.

In one or more embodiments, a first linking arm 1104 is then coupled to the first sliding link 1102 at another pivot point 1105. In a mirror image of that shown in FIG. 11, a second linking arm is coupled to the second sliding link at still another pivot point. Note that while the first linking arm 1104 is shown as being substantially parallel relative to the interior surface 609 of the hinge housing 201 in FIG. 11, in practice the first linking arm 1104 may be aligned in other orientations as a function of application and/or mechanical tolerances.

In the illustrative embodiment of FIGS. 11-12, the hinge housing 201 then rotates about an axis 1106. Since the linking arm 1104 is coupled to the sliding link 1102 at pivot point 1105, the clockwise rotation of the hinge housing 201 about the axis 1106 causes a clockwise rotation of the linking arm 1104. This movement of the linking arm 1104 pulls the sliding link 1102 into the hinge housing 201, thereby causing the displacement 1101 between the first device housing 102 and the hinge housing 201 when the hinge mechanism 1100 is in the closed position 200 to shorten to displacement 1201 when the hinge mechanism 1100 is in the axially displaced open position 400. Note that while the pivot point 1105 is illustratively shown as being aligned with the distal axis of the sliding link 1102, in practice mechanical tolerances may result in the pivot point 1105 being aligned with an offset relative to this distal axis.

In this illustrative embodiment, the pivot point 1105 coupling the sliding link 1102 to the linking arm 1104 is a fixed, pivoting connection point. The sliding link 1102 "slides" into the hinge housing 201 due to the rotation of the linking arm 1104. This rotation of the linking arm 1104 pulls the pivot point 1105 into the hinge housing 201, thereby causing the sliding link 1102 to slide into the housing. This causes not only the first device housing 102 and second device housing (103) to be closer to the hinge housing 201 when the hinge mechanism 1100 is in the axially displaced open position 400 than when in the closed position 200, but also causes the first device housing 102 to be closer to the second device housing 103 when the hinge mechanism 1100 is in the axially displaced open position 400 than when in the closed position 200 as well.

Figure 13:
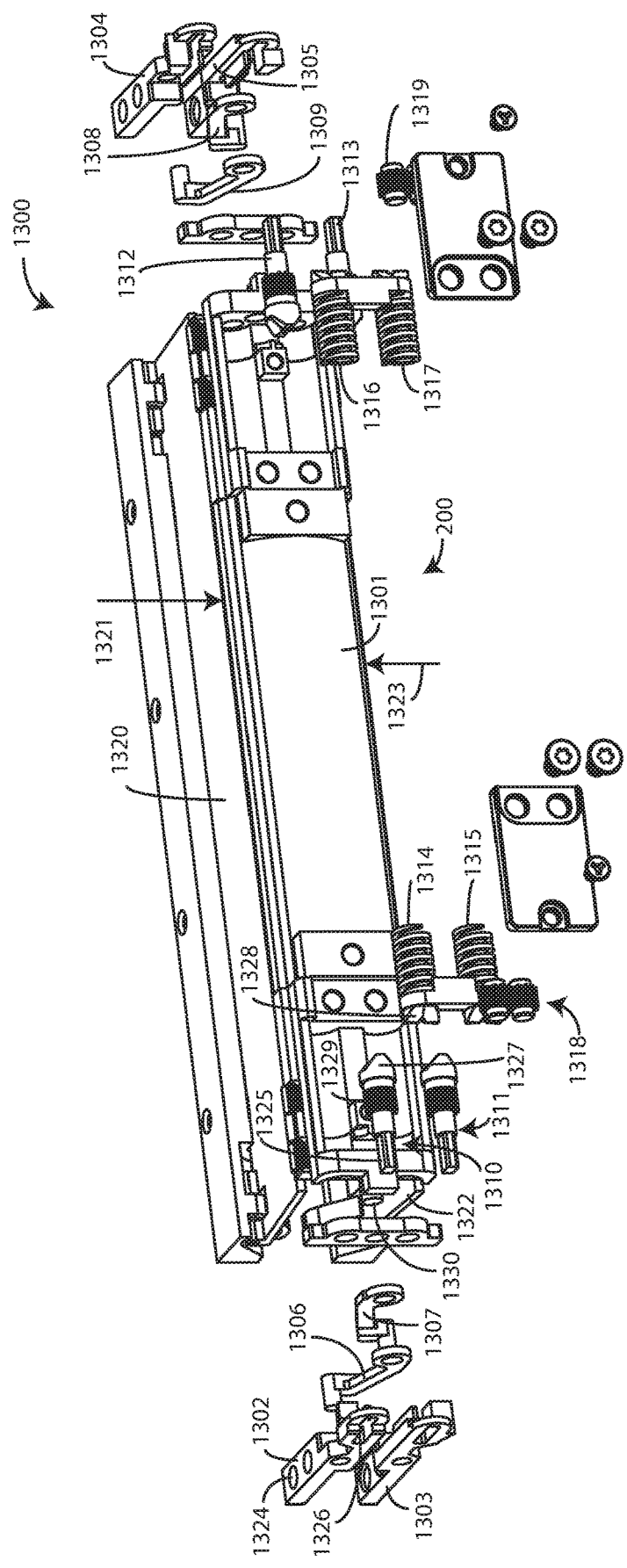
FIG. 13 illustrates an exploded view of one explanatory hinge system in accordance with one or more embodiments of the disclosure.

With this general concept understood from a basic embodiment, attention will now be turned to one explanatory implementation of the concept of FIGS. 11-12 to demonstrate one illustrative example of how the concept can be implemented in an electronic device. Turning now to FIG. 13, illustrated therein is one explanatory hinge mechanism 1300 configured in accordance with one or more embodiments of the disclosure.

As shown in FIG. 13, the hinge mechanism 1300 comprises a hinge housing 1301 and a hinge. In the illustrative embodiment of FIG. 13, the hinge comprises sliding links 1302,1303,1304,1305, linking arms 1306,1307,1308,1309, rotating posts 1310,1311,1312,1313, tensioning springs 1314,1315,1316,1317, and interlocking gears 1318,1319. These components defining the hinge are coupled to the hinge housing 1301. When implemented in an electronic device (100) having a first device housing (102) and a second device housing (103), sliding links 1302,1304 are coupled to the first device housing (102), while sliding links 1303,1305 are coupled to the second device housing (103). This coupling of the hinge to the first device housing (102) and the second device housing (103) allows the first device housing (102) to be pivotable about the hinge housing 1301 between an axially displaced open position (400) and the closed position 200 shown in FIG. 13.

As with the general embodiment of FIGS. 11-12, in FIG. 13 the hinge is configured to change a displacement between the hinge housing 1301 and the first device housing (102) and second device housing (103), respectively, when the first device housing (102) and the second device housing pivot (103) about the hinge housing 1301 between the axially displaced open position (400) and the closed position 200 of FIG. 13. In one or more embodiments, the displacement is shorter when the first device housing (102) and the second device housing (103) are pivoted about the hinge housing 1301 to the axially displaced open position (400) than when the first device housing (102) and second device housing (103) are pivoted about the hinge housing 1301 to the closed position 200 of FIG. 13.

To accomplish this, in one or more embodiments a first sliding link, e.g., sliding link 1302, couples the hinge to the first device housing (102) at a first device housing connection point 1324. The first device housing connection point 1324 causes the sliding link 1302 to pivot relative to the hinge housing 1301 when the first device housing (102) pivots relative to the hinge housing 1301. The other sliding links 1303,1304,1305 can be coupled to corresponding device housing connection points of the first device housing (102) or second device housing (103), whichever is appropriate, in a similar manner.

In one or more embodiments, sliding link 1302 couples to the hinge housing 1301 at a hinge housing pivot point 1325. In this illustrative embodiment, the hinge housing pivot point 1325 comprises a post that extends from rotating post 1310.

In one or more embodiments, the sliding link 1302 defines an aperture 1326 within which the hinge housing pivot point 1325 is positioned. While the general embodiment of FIGS.

11-12 caused the sliding link (1102) to translate into the hinge housing (201) via the linking arm (1104) moving the pivot point (1105) into the hinge housing (201), the embodiment of FIG. 13 causes a similar action of the sliding links 1302,1303,1304,1305, albeit by a slightly different mechanism.

In the illustrative embodiment of FIG. 13, the hinge housing pivot point 1325 has a rectangular cross section that situates within the rectangular perimeter of the aperture 1326 such that the hinge housing pivot point 1325 can translate within the aperture 1326 between at least a first location and a second location as the sliding link 1302 rotates relative to the hinge housing 1301. This ability to translate occurs due to the fact that the width of the aperture 1326 is greater than that of the hinge housing pivot point 1325. This translation, as well as the first location and second location, will be shown in more detail below with reference to FIGS. 16-18. This translation function performs, effectively, the same sliding link movement in FIG. 13 that the pivot point movement did in FIGS. 11-12.

In one or more embodiments, the first location is more centrally located within the sliding link 1302, i.e., more into the page and toward the middle of the sliding link 1302 as viewed in FIG. 13, than the second location, which is more toward the end of the sliding link 1302 and out of the page as viewed in FIG. 13. In one or more embodiments, the hinge housing pivot point 1325 situates at the first location of the aperture 1326 when the first device housing (102) pivots to about the hinge housing 1301 to the axially displaced open position (400). Similarly, the hinge housing pivot point 1325 situates at the second location of the aperture 1326 when the first device housing (102) pivots about the hinge housing 1301 to the closed position 200 of FIG. 13. This translating action changes the displacement (610) between the hinge housing 1301 and the first device housing (102) and second device housing (103). It should be noted that the other sliding links 1303,1304,1305 can be coupled to corresponding hinge housing pivot points of rotating posts 1311,1312,1313 in a similar manner, with sliding links 1302,1304 coupling the hinge to the first device housing (102) and sliding links 1303,1305 coupling the hinge to the second device housing (103).

In one or more embodiments, each hinge housing pivot point 1325 is coupled to a cam 1327 having multiple detents in its face. When the hinge is assembled, the cam 1327 abuts a stator 1328 having protrusions that situate within the detents appearing in the face of the cam 1327. In one or more embodiments, the stator 1328 is coupled to a tensioning spring 1314. When the sliding link 1302 pivots relative to the hinge housing 1301, thereby causing the hinge housing pivot point 1325 to cause the cam 1327 to rotate, the tensioning spring 1314 compresses as the protrusions move into, and out of, the detents of the cam 1327. This spring action allows the device housings coupled to the sliding links 1302,1303,1304,1305 to situate at predefined angles, which can include the axially displaced open position (400) and closed position 200, when the protrusions fully situate within the detents.

In one or more embodiments, the interlocking gears 1318 also situate against corresponding gears 1329 situated at the hinge housing pivot point posts of the rotating posts 1310, 1311,1312,1313 such that the interlocking gears 1318 and the corresponding gears 1329 interlock. When one hinge housing pivot point post rotates due to one device housing pivoting relative to the hinge housing 1301, the interlocking gears 1318 cause the corresponding hinge housing pivot point post to also rotate via the corresponding gears 1329.

In one or more embodiments the interlocking gears 1318 comprise a first toothed wheel and a second toothed wheel that engage a first toothed wheel of a first hinge housing pivot point post and a second toothed wheel of a second hinge housing pivot point post when the first device housing (102) pivots about the hinge housing 1301 relative to the second device housing (103). The engagement of the first toothed wheel and the second toothed wheel of the interlocking gears with the first toothed wheel and second toothed wheel of the hinge housing pivot point posts causes a symmetric angular rotation of the first device housing (102) and the second device housing (103) when the first device housing (102) pivots about the hinge housing 1301 relative to the second device housing (103). Accordingly, in one or more embodiments when the interlocking gears 1318 are operatively coupled to the sliding links 1302,1303,1304, 1305 via the corresponding gears 1329 of the hinge housing pivot points 1325, the interlocking gears 1318 cause a symmetric angular rotation of the sliding links 1302,1303, 1304,1305 when the first device housing (102) pivots about the hinge housing 1301 relative to the second device housing (103).

Looking now at the left side of the hinge mechanism 1300, in one or more embodiments a first linking arm 1306 is coupled to a first sliding link 1302 and a second linking arm 1307 is coupled to a second sliding link 1303. The linking arms 1308,1309 on the right side of the hinge mechanism 1300 can be coupled to the corresponding sliding links 1304,1305 in a similar manner.

In this illustrative embodiment, the first linking arm 1306 and the second linking arm 1307 are then coupled to the hinge housing 1301 at a single hinge housing pivot point 1330. The linking arms 1308,1309 on the right side of the hinge mechanism 1300 can be coupled to a single pivot point in a similar manner.

When the sliding links 1302,1303,1304,1305 rotate relative to the hinge housing 1301 between the closed position 200 and the axially displaced open position (400), the linking arms 1306,1307,1308,1309 act as both checkrein and pushrod upon the sliding links 1302,1303,1304,1305, thereby causing the sliding links 1302,1303,1304,1305 to slide away from the hinge housing 1301 when the hinge mechanism 1300 is in the closed position 200, and toward the hinge housing 1301 when the hinge mechanism 1300 is in the axially displaced open position (400). Said differently, by acting as both checkrein and pushrod, the linking arms 1306,1307,1308,1309 cause the hinge housing pivot points 1325 situated within the apertures 1326 of the sliding links 1302,1303,1304,1305 to translate between the first location of the apertures 1326 and the second location of the apertures 1326. More particularly, the linking arms 1306,1307, 1308,1309 cause the hinge housing pivot points 1325 situated within the apertures 1326 of the sliding links 1302, 1303,1304,1305 to situate at the first location when the first device housing (102) coupled to sliding links 1302,1304 is pivoted about the hinge housing 1301 to the axially displaced open position (400) relative to the second device housing (103) coupled to sliding links 1303,1305, and to situate at the second location when the first device housing (102) coupled to sliding links 1302,1304 is pivoted about the hinge housing 1301 to the axially displaced closed position relative to the second device housing (103) coupled to sliding links 1303,1305. Again, this action will be illustrated in detail below with reference to FIGS. 16-18.

In the illustrative embodiment of FIG. 13, a first support plate 1320 extends distally from a first side 1321 of the hinge housing 1301, while a second support plate 1322 extends distally from a second side 1323 of the hinge housing 1301. The first support plate 1320 and the second support plate 1322 function as described above with reference to FIGS. 6-10.

Figure 14:
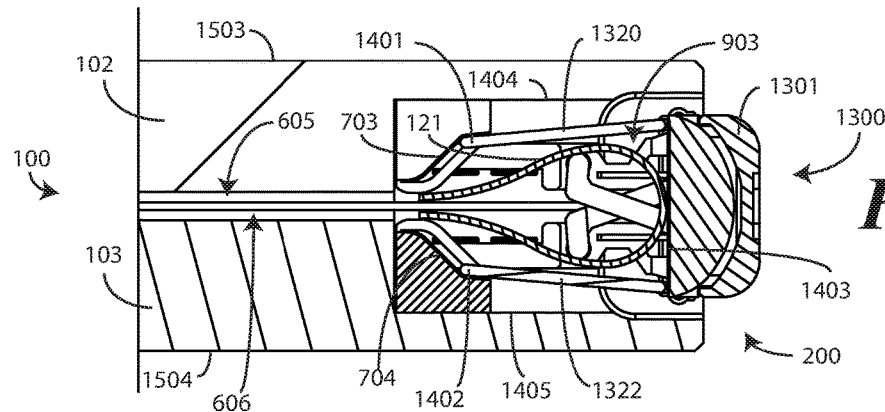
FIG. 14 illustrates a sectional view of one explanatory electronic device in accordance with one or more embodiments of the disclosure when in the closed position.

Turning now to FIG. 14, illustrated therein is a cut away view of the electronic device 100 of FIGS. 1-8, which utilizes the hinge mechanism 1300 of FIG. 13 in this illustrative embodiment. In this illustration, the flexible display 121 is positioned within the linear recesses 605,606 of the first device housing 102 and the second device housing 103, respectively, with a first end of the flexible display 121 fixedly coupled to the first device housing 102 and a second end of the flexible display 121 fixedly coupled to the second device housing 103.

As shown in FIG. 14, the first device housing 102 and the second device housing 103 have been pivoted about the hinge housing 1301 to the closed position 200. In one or more embodiments, when this occurs, a distal end 1401, 1402 of each of the first support plate 1320 and the second support plate 1322 travels along its respective inclined plane 703,704 between a first position (shown in FIG. 15) within the first device housing 102 and the second device housing 103, respectively, to a second position (shown in FIG. 14) within the first device housing 102 and the second device housing 103, respectively.

Figure 15:
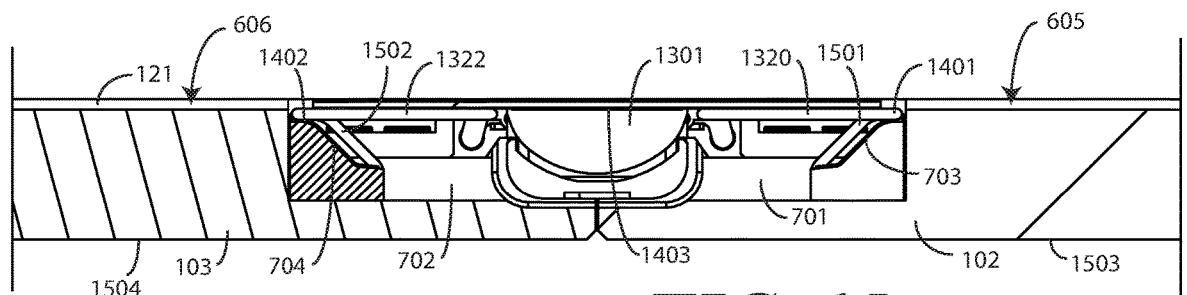
FIG. 15 illustrates a sectional view of one explanatory electronic device in accordance with one or more embodiments of the disclosure when in the axially displaced open position.

The distal ends 1401,1402 of each of the first support plate 1320 and the second support plate 1322 therefore travel, in one or more embodiments, along their respective inclined planes 703,704 between the first position of FIG. 15 within the first device housing 102 and the second device housing 103, respectively, to the second position of FIG. 14 within the first device housing 102 and the second device housing 103, respectively, when the first device housing 102 and the second device housing 103 pivot about the hinge housing 1301 from an axially displaced open position (400) to the closed position 200 of FIG. 14. When this occurs, the first support plate 1320, an interior surface 1403 of the hinge housing 1301, and the second support plate 1322 define boundaries within which the flexible display 121 defines a service loop 903. The area opened for the service loop 903 by the translation of the first support plate 1320 and the second support plate 1322, in one embodiment, has a radius that prevents the flexible display 121 from kinking or folding. It also works to minimize mechanical memory problems when the first device housing 102 and the second device housing 103 pivot about the hinge housing 1301 to the open position (400).

Turning now to FIG. 15, the first device housing 102 and the second device housing 103 have been rotated about the hinge housing 1301 to the axially displaced open position 400. When this occurs, due to the action of the hinge of the hinge housing 1301 (described above with reference to FIG. 13), the distal ends 1401,1402 of the first support plate 1320 and the second support plate 1322 translate up their respective inclined planes 703,704 from the second position of FIG. 14 to the first position shown in FIG. 15. In the illustrative embodiment of FIG. 15, when the distal ends 1401,1402 of the first support plate 1320 and the second support plate 1322 fully translate up their respective inclined planes 703,704 from the second position of FIG. 14 to the first position shown in FIG. 15, they sit atop ends 1501,1502 of the inclined planes 703,704.

In this position, and as shown in FIG. 15, when the distal ends 1401,1402 of the first support plate 1320 and the second support plate 1322 fully translate up their respective inclined planes 703,704 from the second position of FIG. 14 to the first position shown in FIG. 15, the first support plate 1320, the interior surface 1403 of the hinge housing 1301, and the second support plate 1322 bridge the linear recess defined by the of the first device housing 102 and the linear recess 606 of the second device housing 103 when the first device housing 102 and the second device housing 103 are in an axially displaced open position 400 shown in FIG. 15.

By comparing FIG. 14 and FIG. 15, a number of characteristics of embodiments of the disclosure can be seen. For example, in this illustrative embodiment the support plates 1320,1322 are closer to the flexible display 121 when in the first position of FIG. 15, and can therefore provide mechanical support for the flexible display 121 by bridging the linear recess 605 of the first device housing 102 and the linear recess 606 of the second device housing 103 when the first device housing 102 and the second device housing 103 are in an axially displaced open position 400 shown in FIG. 15. By contrast, as shown in FIG. 14, the support plates 1320, 1322 are farther from the flexible display 121 when in the second position. This occurs due to the fact that the distal ends 1401,1402 of the each of the first support plate 1320 and the second support plate 1322 travel along their corresponding inclined plane 703,704 from the first position to the second position when the first device housing 102 and the second device housing 103 pivot about the hinge housing 1301 from the axially displaced open position 400 to the closed position 200 to allow the flexible display to define a service loop 903 shown in FIG. 14.

In one or more embodiments, the support plates 1320, 1322 are farther from exterior surfaces 1503,1504 of the first device housing 102 and the second device housing 103 when in the first position of FIG. 15, but are closer to those exterior surfaces 1503,1504 of the first device housing 102 and the second device housing 103 when in the second position of FIG. 14. This results in the second position of FIG. 14 being deeper, relative to the interior surfaces 1404,1405 of the first device housing 102 and the second device housing 103, respectively, than the first position of FIG. 15.

As shown in FIG. 15, where included, the linear recesses 605,606 of the first device housing 102 and the second device housing 103 define a support plane for the flexible display 121 on sides of the first device housing 102 and the second device housing 103 exterior of the chambers 701,702 defining the support plate receiving recesses of the first device housing 102 and the second device housing 103, respectively. However, the first support plate 1320, the interior surface 1403 of the hinge housing 1301, and the second support plate 1322 bridge this support plane of the first device housing 102 and the support plane of the second device housing 103 in the second position of FIG. 15 to mechanically support the flexible display 121 when the first device housing 102 and the second device housing 103 pivot about the hinge housing 1301 to the axially displaced open position 400 from the closed position 200. In this illustrative embodiment, the first support plate 1320, the interior surface 1403 of the hinge housing 1301, and the second support plate 1322 define a contiguous planar surface spanning the support plane defined by the linear recess 605 of the first device housing 102 and the support plane defined by the linear recess 606 of the second device housing 103 in the closed position 200.

As shown in FIGS. 14 and 15, the hinge housing 1301 and its corresponding support plates 1320,1322 serve two functions: First, they provide mechanical support for the flexible display 121 when the first device housing 102 has pivoted about the hinge housing 1301 relative to the second device housing 103 to an axially displaced open position 400 of FIG. 15. However, when the first device housing 102 pivots about the hinge 101 relative to the second device housing 103 to the closed position 200 of FIG. 14 where the first device housing 102 and the second device housing 103 abut, the support plates 1320,1322 translate along their respective inclined planes 703,704 within the first device housing 102 and second device housing 103, respectively, to recede into the first device housing 102 and second device housing 103.

Said differently, when the first device housing 102 pivots about the hinge housing 1301 relative to the second device housing 103 to the closed position 200 of FIG. 14, the support plates 1320,1322 move toward the exterior surfaces 1503,1504 of the first device housing 102 and the second device housing 103, respectively, thereby receding "outward" from the interior surfaces of the first device housing 102 and the second device housing 103. This "collapse" of the first support plate 1320 and the second support plate 1322 creates a cavity in the hinge portion of the electronic device 100 shown in FIG. 14 that allows the flexible display 121 to form the service loop 903. The service loop 903 prevents the flexible display 121 from being damaged or developing memory in the folded position when the electronic device 100 is in the closed position 200 of FIG. 14. Advantageously, hinge mechanisms 1300 configured in accordance with one or more embodiments of the disclosure provide a solution that provides the needed system flexibility by providing support for the flexible display 121 when in the axially displaced open position 400 of FIG. 15, but allows for service loop 903 of the flexible display 121 to occur when the electronic device 100 is in the closed position 200 of FIG. 14.

As can be seen by comparing FIGS. 14-15, in this illustrative embodiment the interior surface 1403 of the hinge housing 1301 is positioned farther outward from the first device housing 102 and the second device housing 103, respectively, when the first device housing 102 and second device housing 103 are pivoted about the hinge housing 1301 to the closed position 200 than when the first device housing 102 and second device housing 103 are pivoted about the hinge housing 1301 to the axially displaced open position 400. As described above with reference to FIG. 13, this occurs due to the fact that linking arms of the hinge mechanism 1300 act as checkrein and pushrod to cause hinge housing pivot points to translate within apertures of sliding links between a first position and a second position as the first device housing 102 and second device housing 103 pivot about the hinge housing 1301 between the closed position 200 and the axially displaced open position 400. Illustrations of how this occurs are presented in FIGS. 16-18.

Figure 16:
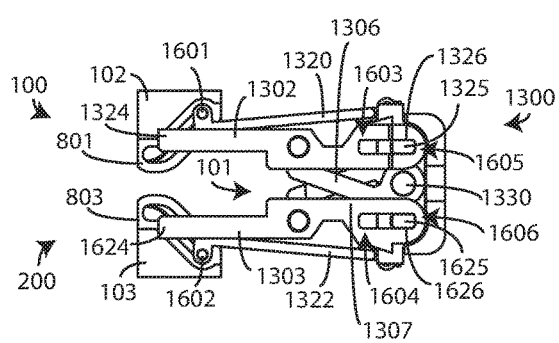
FIG. 16 illustrates one explanatory spring mechanism in accordance with one or more embodiments of the disclosure when in the closed position.
Figure 17:
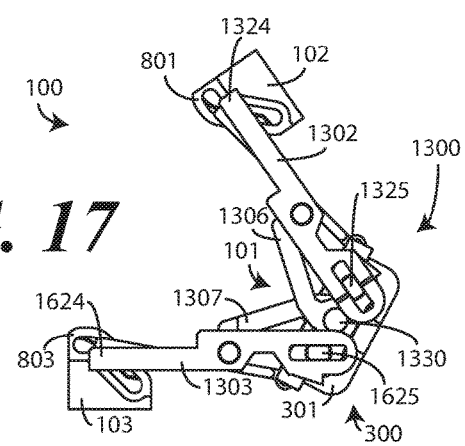
FIG. 17 illustrates the explanatory spring mechanism of FIG. 16 when in the partially open position.
Figure 18:
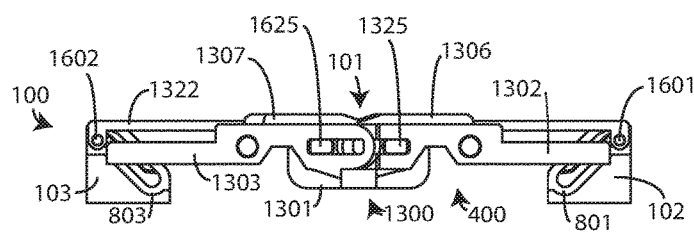
FIG. 18 illustrates the explanatory spring mechanism of FIG. 16 when in the axially displaced open position.

Turning now to FIGS. 16-18, illustrated therein is another sectional view of the electronic device 100 of FIGS. 1-8, which utilizes the hinge mechanism 1300 of FIG. 13 in this illustrative embodiment. The sectional views of FIGS. 16-18 illustrate the components of the hinge of the hinge mechanism 1300 as the electronic device 100 transitions between the closed position 200 and the axially displaced open position 400. FIG. 16 illustrates the electronic device 100 in the closed position 200, while FIG. 18 illustrates the electronic device 100 in the axially displaced open position 400. FIG. 17 illustrates the electronic device 100 in a partially open position 300 or "tent" position.

FIGS. 16-18 also illustrate the inclined planes (703,704) being augmented with, and bounded by, inclined apertures 801,803 within which posts 1601,1602 extending distally from the edges of the first support plate 1320 and second support plate 1322 insert. This configuration latches and retains the posts 1601,1602 within the inclined apertures 801,803, thereby defining an enclosed track within which the posts 1601,1602 may travel as the electronic device 100 pivots between the axially displaced open position 400 and the closed position 200. As noted above, while the inclined apertures 801, 803 are included in addition to the inclined planes (703,704) in the illustrative embodiment of FIGS. 16-18, in other embodiments the inclined apertures 801, 803 will be omitted. In still other embodiments, the inclined apertures 801, 803 will replace the inclined planes (703, 704). Other configurations will be obvious to those of ordinary skill in the art having the benefit of this disclosure.

As shown in FIGS. 16-18, the electronic device 100 includes a first device housing 102 and a second device housing 103. A hinge housing 1301 comprising a hinge 101 that couples the first device housing 102 to the second device housing 103.

In one or more embodiments, the hinge 101 comprises at least a first sliding link 1302 coupled between a first device housing connection point 1324 situated at the first device housing 102 and a first hinge housing pivot point 1325 situated at the hinge housing 1301, In this illustrative embodiment, the hinge 101 also comprises a second sliding link 1303 coupled between a second device housing connection point 1624 situated at the second device housing 103 and a second hinge housing pivot point 1625 situated at the hinge housing 1301.

In one or more embodiments, one or more of the first sliding link 1302 or the second sliding link 1303 is slidable along the first hinge housing pivot point 1325 or the second hinge housing pivot point 1625, respectively, to cause a displacement between the first device housing 102 and the second device housing 103, as well as between the first device housing 102 and the hinge housing 1301 and the second device housing 103 and the hinge housing 1301, to change as the first device housing 102 pivots relative to the second device housing 103 about the hinge housing 1301 from the closed position 200 to an axially displaced open position 400.

In one or more embodiments, this sliding is the result of the operation of a first linking arm 1306 and a second linking arm 1307. To wit, in the illustrative embodiment of FIGS. 16-18 the first linking arm 1306 is coupled to the first sliding link 1302, while the second linking arm 1307 is coupled to the second sliding link 1303. In one or more embodiments, the first linking arm 1306 causes the first sliding link 1302 to slide along the first hinge housing pivot point 1325 as the first device housing 102 pivots relative to the second device housing 103 about the hinge housing 1301 from the closed position 200 to an axially displaced open position 400. Similarly, the second linking arm 1307 causes the second sliding link 1303 to slide along the second hinge housing pivot point 1625 as the first device housing 102 pivots relative to the second device housing 103 about the hinge housing 1301 from the closed position 200 to the axially displaced open position 400. As best seen in FIGS. 16-17, in this illustrative embodiment the first linking arm 1306 and the second linking arm 1307 are coupled to the hinge housing 1301 at a single hinge housing pivot point 1330.

As previously described, in this illustrative embodiment the first sliding link 1302 and the second sliding link 1303 each define an aperture 1326,1626 within which the first hinge housing pivot point 1325 and the second hinge housing pivot point 1625 can translate, respectively, between at least a first location 1603,1604 and a second location 1605, 1606. As shown in these figures, the first location 1603,1604 is more centrally located within the first sliding link 1302 and second sliding link 1303, respectively, than the second location 1605,1606.

As best seen in FIG. 18, the first hinge housing pivot point 1325 and the second hinge housing pivot point 1625 situate at the first location 1603,1604 when the first device housing 102 and the second device housing 103 pivot about the hinge housing 1301 to the axially displaced open position 400. By contrast, as best seen in FIG. 17, the first hinge housing pivot point 1325 and the second hinge housing pivot point 1625 situate at the second location 1605,1606 when the first device housing 102 and the second device housing 103 pivot about the hinge housing 1301 to the axially displaced open position 200.

Figure 19:
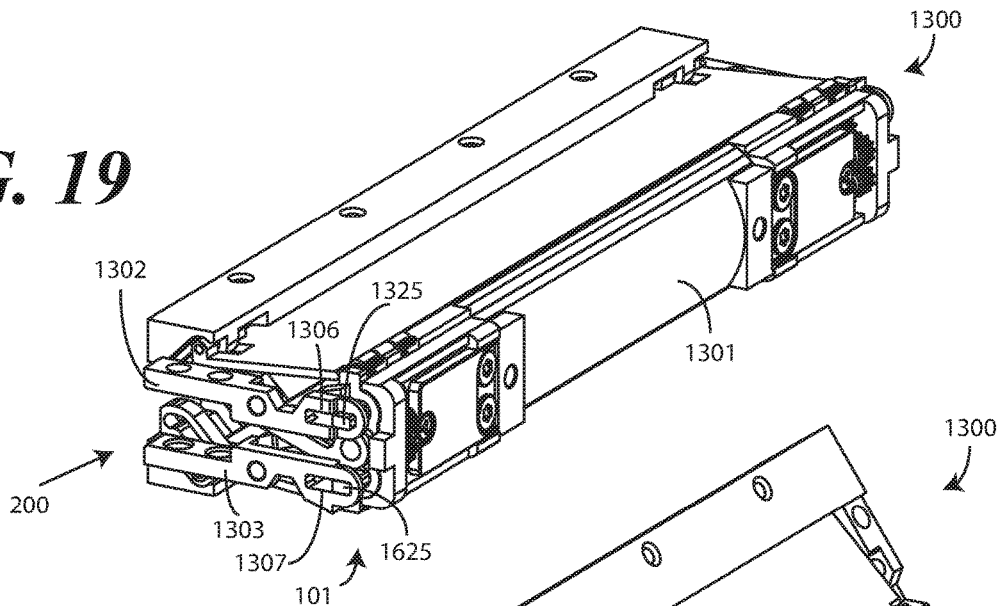
FIG. 19 illustrates the explanatory spring mechanism of FIG. 13 in the closed position.
Figure 20:
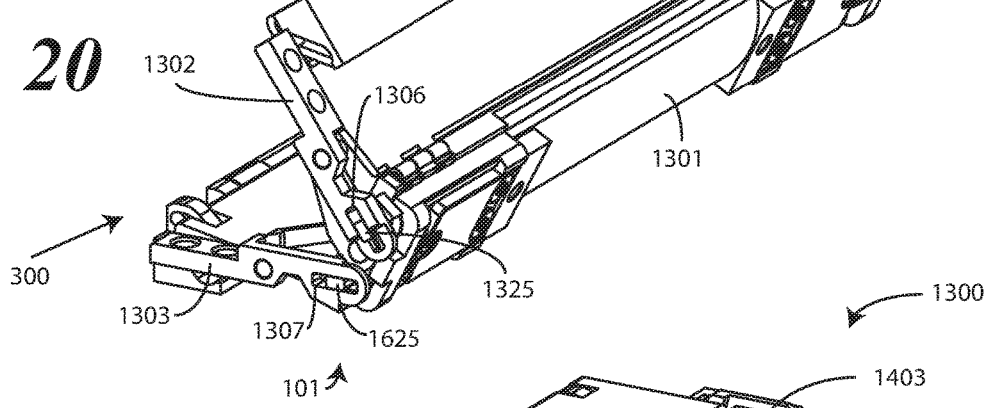
FIG. 20 illustrates the explanatory spring mechanism of FIG. 13 in a partially open position.
Figure 21:
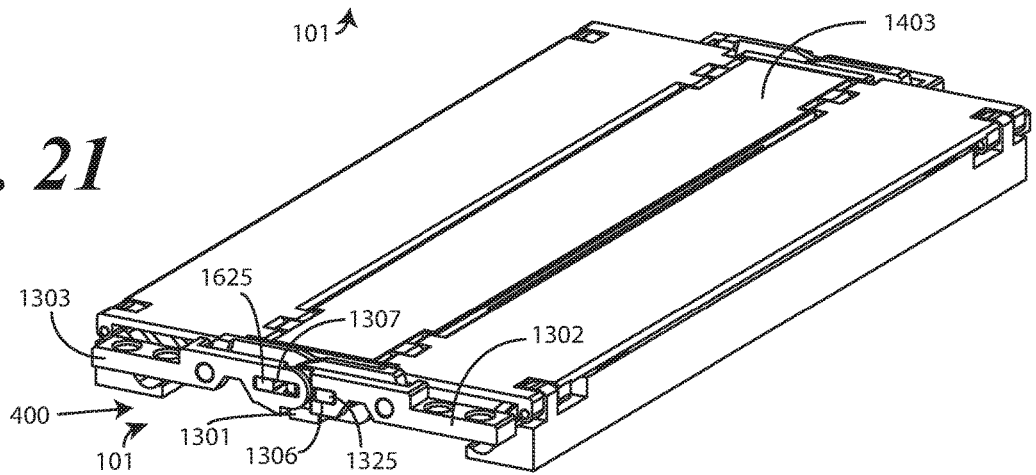
FIG. 21 illustrates the explanatory spring mechanism of FIG. 13 in the axially displaced open position.

Turning now to FIGS. 19-21, illustrated therein are perspective views of the hinge mechanism 1300 of FIGS. 16-18. These perspective views are provided so show additional details of the hinge mechanism 1300 to provide even better clarity of the action of the hinge mechanism during the pivoting process. The perspective views of FIGS. 19-21 illustrate the components of the hinge of the hinge mechanism 1300 as it transitions between the closed position 200 and the axially displaced open position 400. FIG. 19 illustrates the hinge mechanism 1300 in the closed position 200, while FIG. 21 illustrates the hinge mechanism 1300 in the axially displaced open position 400. FIG. 20 illustrates the hinge mechanism 1300 in a partially open position 300.

The functions of the hinge mechanism 1300 as it passes to or through these positions were fully described above with reference to FIGS. 16-18. However, simply to underscore the operation for clarity, a brief synopsis of the operation of the hinge mechanism 1300 will be reprised here.

As previously described, a hinge housing 1301 comprising a hinge 101. The hinge 101 is configured to couple a first device housing (102) to the hinge housing 1301 with a first sliding link 1302. The hinge 101 is also configured to couple a second device housing (103) to the hinge housing 1301 with a second sliding link 1303.

As before, the hinge 101 is configured to change a displacement between the hinge housing 1301 and the first device housing (102) and second device housing (103), respectively, when the first device housing (102) and the second device housing (103) pivot about the hinge housing 1301 between the axially displaced open position 400 and the closed position 200. In particular, the hinge 101 makes the displacement of the first device housing (102) and the second device housing (103) relative to the hinge housing 1301 shorter when the first device housing (102) and the second device housing (103) are pivoted about the hinge housing 1301 to the axially displaced open position 400 than when the first device housing (102) and second device housing (103) are pivoted about the hinge housing 1301 to the closed position 200.

This operative action results in the interior surface 1403 of the hinge housing 1301 being positioned farther from the first device housing (102) and the second device housing (103), respectively, when the first device housing (102) and second device housing (103) are pivoted about the hinge housing 1301 to the closed position 200 than when the first device housing (102) and second device housing (103) are pivoted about the hinge housing 1301 to the axially displaced open position 400. This operative action also results in the first sliding link 1302 and the second sliding link 1303 extending farther from the hinge housing 1301, as shown in FIG. 19, when the first device housing (102) is pivoted about the hinge housing 1301 relative to the second device housing (103) to the closed position 200 than when the first device housing (102) is pivoted about the hinge housing 1301 relative to the second device housing (103) to the axially displaced open position 400, as shown in FIG. 21.

As before, the sliding action, and thus displacement change, is the result of one or more linking arms. Specifically, in FIGS. 19-21 a first linking arm 1306 is coupled between the hinge housing 1301 and the first sliding link 1302, while a second linking arm 1307 is coupled between the hinge housing 1301 and the second sliding link 1303. As previously described, the first linking arm 1306 and the second linking arm 1307 cause the first sliding link 1302 and the second sliding link 1303 to translate along a first hinge housing pivot point 1325 and a second hinge housing pivot point 1625, respectively, when the first device housing (102) and the second device housing pivot (103) about the hinge housing 1301 between the closed position 200 and the axially displaced open position 400.

Figure 22:
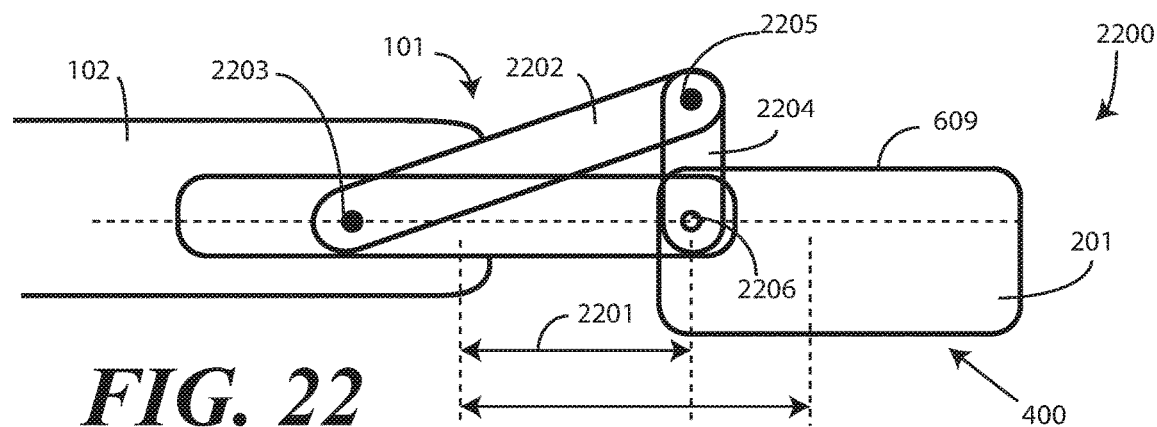
FIG. 22 illustrates a portion of another explanatory hinge mechanism in accordance with one or more embodiments of the disclosure when the hinge mechanism is in the axially displaced open position.
Figure 23:
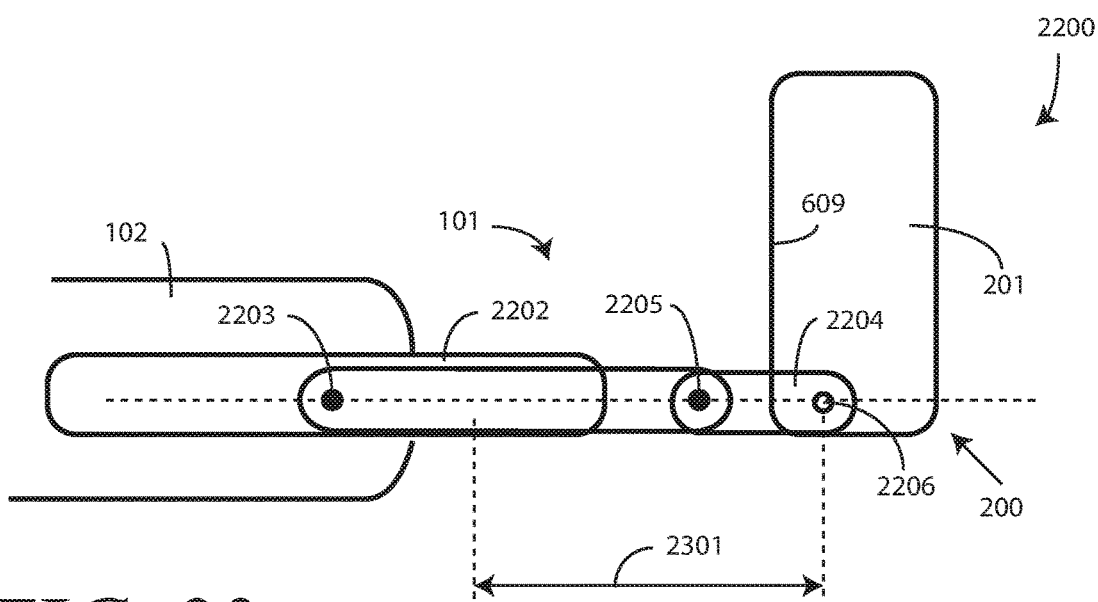
FIG. 23 illustrates the portion of the explanatory hinge mechanism of FIG. 22 in the axially displaced open position.

Turning now to FIGS. 22-23, illustrated therein is another general mechanical schematic illustrating another explanatory way that the displacement between device housings and a hinge housing can be altered as a hinge mechanism 2200 transitions between a closed position 200 and an axially displaced open position 400. Shown in FIGS. 22-23 is another hinge mechanism 2200, which is distinct from the hinge mechanism (1100) of FIGS. 11-12, but which is also configured to change a displacement 2201,2301 between the hinge housing 201 and the first device housing 102 and second device housing (103), respectively, when the first device housing 102 and the second device housing (103) pivot about the hinge housing 201 between the axially displaced open position 400 and the closed position 200.

As was the case with FIGS. 11-12, it should be noted that with reference to FIGS. 22-23, again for simplicity, only half of the hinge mechanism 2200 is shown. For example, the first device housing 102 is shown, while the second device housing (103) is not. In practice, a mirror image of the components other than the hinge housing 201 would appear to the right of the hinge housing 201 in FIG. 22. The same is true with reference to FIG. 23—in practice, a mirror image of the components other than the hinge housing 201 would appear on the top side of the hinge housing 201, and so forth. Those of ordinary skill in the art having the benefit of this disclosure will readily recognize how, for example, the second device housing (103) couples to the hinge mechanism 2200 in view of the half mirror image shown in FIGS. 22-23.

In one or more embodiments, the hinge housing 201 again comprises a hinge 101 that couples a first device housing 102 of an electronic device to a second device housing (103) such that the first device housing 102 is pivotable about the hinge housing 201 relative to the second device housing (103) between a closed position 200 and an axially displaced open position 400. In one or more embodiments, the hinge 101 changes a displacement 2201,2301 between the first device housing 102 and the second device housing (103), respectively, when the first device housing 102 and the second device housing (103) pivot about the hinge housing 201 between the axially displaced open position 400 and the closed position 200. This allows an interior surface 609 of the hinge housing 201 to be positioned farther from the first device housing 102 and the second device housing (103), respectively, when the first device housing 102 is pivoted about the hinge housing 201 relative to the second device housing (103) to the closed position 200 than when the first device housing 102 is pivoted about the hinge housing 201 relative to the second device housing (103) to the axially displaced open position 400.

In one or more embodiments, a first sliding link 2202 couples the hinge 101 to the first device housing 102 at a first pivot point 2203. In a mirror image of that shown in FIG. 22, a second sliding link then couples the hinge 101 to the second device housing (103) at a second pivot point.

In one or more embodiments, a first linking arm 2204 is then coupled to the first sliding link 2202 at another pivot point 2205. In a mirror image of that shown in FIG. 11, a second linking arm is coupled to the second sliding link at still another pivot point. Note that while the first linking arm 2204 is shown as being substantially orthogonal relative to the interior surface 609 of the hinge housing 201 in FIG. 22, in practice the first linking arm 2204 may be aligned in other orientations as a function of application and/or mechanical tolerances.

In the illustrative embodiment of FIGS. 22-23, the hinge housing 201 then rotates about an axis 2206. Since the linking arm 2204 is coupled to the sliding link 2202 at pivot point 2205, the counterclockwise rotation of the hinge housing 201 about the axis 2206 causes a counterclockwise rotation of the linking arm 2204. This movement of the linking arm 2204 pushes the sliding link 2202 away from the hinge housing 201, thereby causing the displacement 2201 between the first device housing 102 and the hinge housing 201 when the hinge mechanism 1100 is in the axially displaced open position 400 to extend to displacement 2201 when the hinge mechanism 2200 is in the closed position 200. This causes not only the first device housing 102 and second device housing (103) to be closer to the hinge housing 201 when the hinge mechanism 2200 is in the axially displaced open position 400 than when in the closed position 200, but also causes the first device housing 102 to be closer to the second device housing (103) when the hinge mechanism 2200 is in the axially displaced open position 400 than when in the closed position 200 as well.

As with the hinge mechanism (1100) of FIGS. 11-12, in FIGS. 22-23 the sliding link 2202 rotates relative to the hinge housing 201 between the closed position 200 and the axially displaced open position 400, the linking arm 2204 again acts as both checkrein and pushrod upon the sliding link 2202, albeit with the hinge housing 201 in a different position relative to the linking arm/sliding link arrangement. While sliding link (1102) and linking arm (1104) were colinear when the hinge housing (201) was rotated to the axially displaced open position (400) relative to the first device housing 102 and second device housing (103) in FIGS. 11-12, the sliding link 2202 and linking arm 2204 of FIGS. 22-23 are colinear when the hinge housing 201 when the hinge housing 201 is rotated to the closed position 200 in FIGS. 22-23. (While this is the case in one embodiment, in other embodiments the distal axis of the sliding link 1102 may be offset from one or both of the linking arm 2204 and/or the pivot point 2205, as was the case with FIGS. 11-12 above.) As will be described in more detail below with reference to FIGS. 33-35, in one or more embodiments this slight reconfiguration causes the hinge housing pivot points situated within the apertures of the linking arms to move more quickly at the onset of bending, thereby preventing one or both of binding of the hinge housing pivot points within the apertures of the sliding links and/or interference between the hinge mechanism 2200 and the flexible display (121).

As was the case with FIGS. 11-12, in FIGS. 22-23 the movement of the pivot point 2205 causes the sliding link 2202 to move into, and out of, the hinge housing 201.

Figure 24:
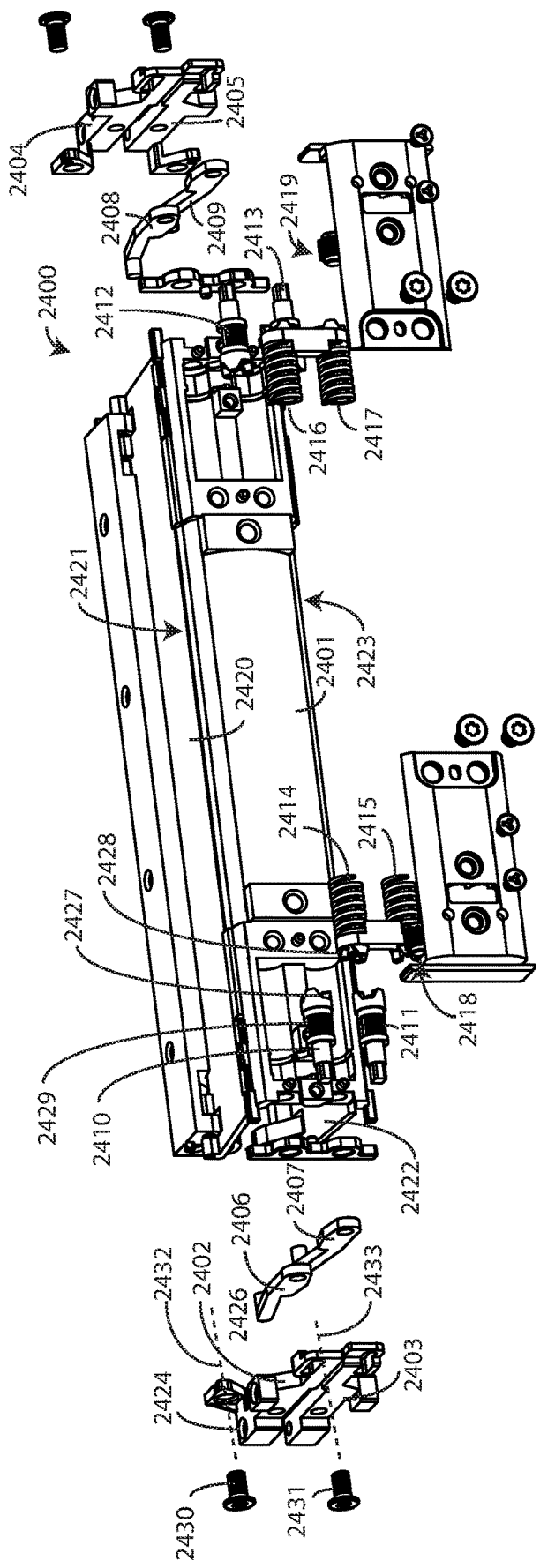
FIG. 24 illustrates an exploded view of another explanatory hinge system in accordance with one or more embodiments of the disclosure.

However, turning now to FIG. 24, illustrated therein is one explanatory implementation of the concept of FIGS. 22-23 to demonstrate one illustrative example of how the concept can be implemented in an electronic device using translation of the sliding links along the pivot point, as was the case in FIG. 13 above, rather than movement of the pivot point. While slightly different in implementation, the effect is the same.

As shown in FIG. 24, explanatory hinge mechanism 2400 configured in accordance with one or more embodiments of the disclosure. The hinge mechanism 2400 comprises a hinge housing 2401 and a hinge. In the illustrative embodiment of FIG. 24, the hinge comprises sliding links 2402, 2403, 2404, 2405, linking arms 2406, 2407, 2408, 2409, rotating posts 2410, 2411, 2412, 2413, tensioning springs 2414, 2415, 2416, 2417, and interlocking gears 2418, 2419. These components defining the hinge are coupled to the hinge housing 2401.

When implemented in an electronic device (100) having a first device housing (102) and a second device housing (103), sliding links 2402, 2404 are coupled to the first device housing (102), while sliding links 2403, 2405 are coupled to the second device housing (103). This coupling of the hinge to the first device housing (102) and the second device housing (103) allows the first device housing (102) to be pivotable about the hinge housing 2401 between an axially displaced open position (400) and the closed position 200 shown in FIG. 24.

The hinge, like the hinge of FIG. 13, is configured to change a displacement between the hinge housing 2401 and the first device housing (102) and second device housing (103), respectively, when the first device housing (102) and the second device housing pivot (103) about the hinge housing 2401 between the axially displaced open position (400) and the closed position 200 of FIG. 24. In one or more embodiments, the displacement is shorter when the first device housing (102) and the second device housing (103) are pivoted about the hinge housing 2401 to the axially displaced open position (400) than when the first device housing (102) and second device housing (103) are pivoted about the hinge housing 2401 to the closed position 200 of FIG. 24.

To accomplish this, in one or more embodiments a first sliding link, e.g., sliding link 2402, couples the hinge to the first device housing (102) at a first device housing connection point 2424. The first device housing connection point 2424 causes the sliding link 2402 to pivot relative to the hinge housing 2401 when the first device housing (102) pivots relative to the hinge housing 2401. The other sliding links 2403, 2404, 2405 can be coupled to corresponding device housing connection points of the first device housing (102) or second device housing (103), whichever is appropriate, in a similar manner.

In one or more embodiments, sliding link 2402 couples to the hinge housing 2401 at a hinge housing pivot point 2425. In this illustrative embodiment, the hinge housing pivot point 2425 comprises a post that extends from rotating post 2410.

In one or more embodiments, the sliding link 2402 defines an aperture 2426 within which the hinge housing pivot point 2425 is positioned. Here the hinge housing pivot point 2425 has a rectangular cross section that situates within the rectangular perimeter of the aperture 2426 such that the hinge housing pivot point 2425 can translate within the aperture 2426 between at least a first location and a second location as the sliding link 2402 rotates relative to the hinge housing 2401. This ability to translate occurs due to the fact that the width of the aperture 2426 is greater than that of the hinge housing pivot point 2425 in this illustrative embodiment.

In one or more embodiments, the first location is more centrally located within the sliding link 2402 than the second location. In one or more embodiments, the hinge housing pivot point 2425 situates at the first location of the aperture 2426 when the first device housing (102) pivots to about the hinge housing 2401 to the axially displaced open position (400). Similarly, the hinge housing pivot point 2425 situates at the second location of the aperture 2426 when the first device housing (102) pivots about the hinge housing 2401 to the closed position 200 of FIG. 24. This translating action changes the displacement between the hinge housing 2401 and the first device housing (102) and second device housing (103).

In one or more embodiments, each hinge housing pivot point 2425 is coupled to a cam 2427 having multiple detents in its face. When the hinge is assembled, the cam 2427 abuts a stator 2428 having protrusions that situate within the detents appearing in the face of the cam 2427. In one or more embodiments, the stator 2428 is coupled to a tensioning spring 2414. When the sliding link 2402 pivots relative to the hinge housing 2401, thereby causing the hinge housing pivot point 2425 to cause the cam 2427 to rotate, the tensioning spring 2414 compresses as the protrusions move into, and out of, the detents of the cam 2427. This spring action allows the device housings coupled to the sliding links 2402,2403,2404,2405 to situate at predefined angles, which can include the axially displaced open position (400) and closed position 200, when the protrusions fully situate within the detents.

In one or more embodiments, the interlocking gears 2418 again situate against corresponding gears 2429 situated at the hinge housing pivot point posts of the rotating posts 2410,2411,2412,2413 such that the interlocking gears 2418 and the corresponding gears 2429 interlock. When one hinge housing pivot point post rotates due to one device housing pivoting relative to the hinge housing 2401, the interlocking gears 2418 cause the corresponding hinge housing pivot point post to also rotate via the corresponding gears 2429. As previously described, the engagement of the toothed wheels of the interlocking gears 2418 with the toothed wheels of the rotating posts 2410,2411,2412,2413 causes a symmetric angular rotation of the first device housing (102) and the second device housing (103) when the first device housing (102) pivots about the hinge housing 2401 relative to the second device housing (103).

In one or more embodiments a first linking arm 2406 is coupled to a first sliding link 2402 and a second linking arm 2407 is coupled to a second sliding link 2403. The linking arms 2408,2409 on the right side of the hinge mechanism 2400 can be coupled to the corresponding sliding links 2404,2405 in a similar manner.

In contrast to the hinge mechanism (1300) of FIG. 13, where the first linking arm (1306) and the second linking arm (1307) were coupled to the hinge housing (1301) at a single hinge housing pivot point (1330), in the illustrative embodiment of FIG. 24 the first linking arm 2406 is coupled to the hinge housing 2401 at a first hinge housing pivot point 2430, while the second sliding link 2403 is coupled to the hinge housing 2401 at a second hinge housing pivot point 2431. This "dual pivot point" configuration of FIG. 24 allows the first sliding link 2402 to pivot about a first axis 2432 while the second sliding link 2403 pivots about a second axis 2433. In this illustrative embodiment, the first axis 2432 and the second axis 2433 are separate and parallel. The linking arms 2408,2409 on the right side of the hinge mechanism 2400 can be coupled to dual pivot points along the first axis 2432 and the second axis 2433 in a similar manner.

As with the embodiment of FIG. 13, in FIG. 24 when the sliding links 2402,2403,2404,2405 rotate relative to the hinge housing 2401 between the closed position 200 and the axially displaced open position (400), the linking arms 2406,2407,2408,2409 again act as both checkrein and pushrod upon the sliding links 2402,2403,2404,2405, thereby causing the sliding links 2402,2403,2404,2405 to slide away from the hinge housing 2401 when the hinge mechanism 2400 is in the closed position 200, and toward the hinge housing 2401 when the hinge mechanism 2400 is in the axially displaced open position (400). By acting as both checkrein and pushrod, the linking arms 2406,2407,2408,2409 cause the hinge housing pivot points 2425 situated within the apertures 2426 of the sliding links 2402,2403, 2404,2405 to translate between the first location of the apertures 2426 and the second location of the apertures 2426.

As before, a first support plate 2420 extends distally from a first side 2421 of the hinge housing 2401, while a second support plate 2422 extends distally from a second side 2423 of the hinge housing 2401. The first support plate 2420 and the second support plate 2422 function as described above with reference to FIGS. 6-10.

Figure 25:
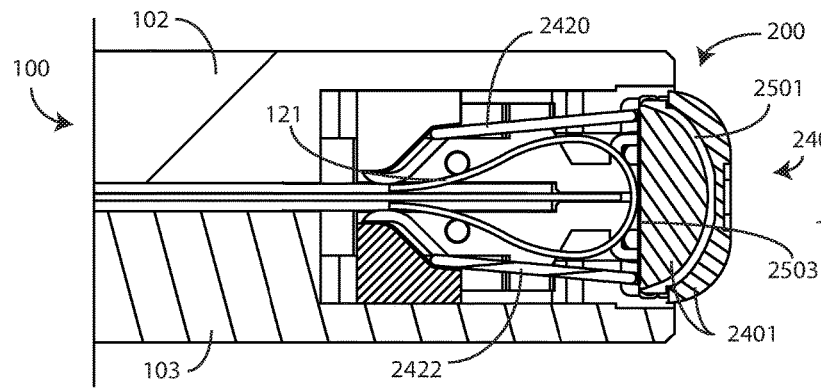
FIG. 25 illustrates a sectional view of another explanatory electronic device in accordance with one or more embodiments of the disclosure when in the closed position.

Turning now to FIG. 25, illustrated therein is a cut away view of the electronic device 100 of FIGS. 1-8, which utilizes the hinge mechanism 2400 of FIG. 24 in this illustrative embodiment. In this illustration, the flexible display 121 is fixedly coupled to the first device housing 102 and the second device housing 103, respectively.

As shown in FIG. 25, the first device housing 102 and the second device housing 103 have been pivoted about the hinge housing 2401 to the closed position 200. In one or more embodiments, when this occurs, a distal end of each of the first support plate 2320 and the second support plate 2422 travels along its respective inclined plane between a first position (shown in FIG. 26) within the first device housing 102 and the second device housing 103, respectively, to a second position (shown in FIG. 25) within the first device housing 102 and the second device housing 103, respectively.

Figure 26:
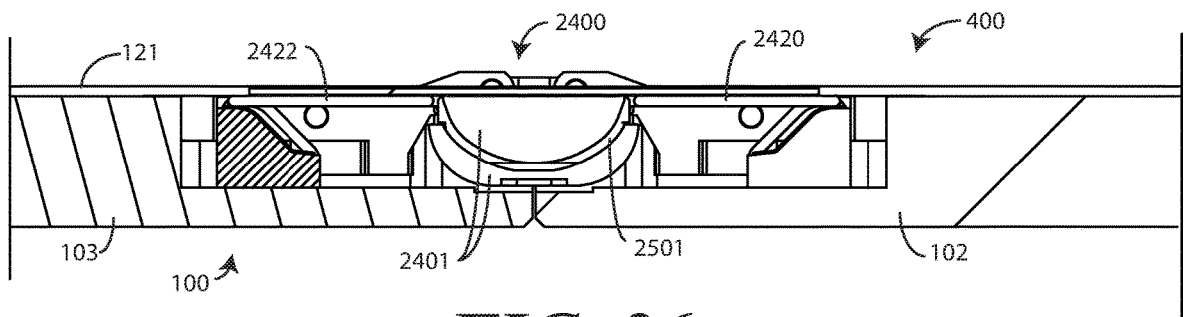
FIG. 26 illustrates a sectional view of another explanatory electronic device in accordance with one or more embodiments of the disclosure when in the axially displaced open position.

The distal ends of each of the first support plate 2420 and the second support plate 2422 therefore travel, in one or more embodiments, along their respective inclined planes between the first position of FIG. 26 within the first device housing 102 and the second device housing 103, respectively, to the second position of FIG. 25 within the first device housing 102 and the second device housing 103, respectively, when the first device housing 102 and the second device housing 103 pivot about the hinge housing 2401 from an axially displaced open position (400) to the closed position 200 of FIG. 25, as previously described. When this occurs, the first support plate 2420, an interior face 2503 of the hinge housing 2401, and the second support plate 2422 define boundaries within which the flexible display 121 defines a service loop.

Turning now to FIG. 26, the first device housing 102 and the second device housing 103 have been rotated about the hinge housing 2401 to the axially displaced open position 400. When this occurs, due to the action of the hinge of the hinge housing 2401 (described above with reference to FIG. 24), the distal ends of the first support plate 2420 and the second support plate 2422 translate up their respective inclined planes from the second position of FIG. 25 to the first position shown in FIG. 26. When the distal ends of the first support plate 2420 and the second support plate 2422 fully translate up their respective inclined planes from the second position of FIG. 25 to the first position shown in FIG. 26, they sit atop ends of the inclined planes, thereby bridging the first device housing 102 and the second device housing 103 when the first device housing 102 and the second device housing 103 are in an axially displaced open position 400.

It should be noted that in FIGS. 24-25, as was the case with FIGS. 14-15, the hinge housing 2401 defines a crescent shaped duct 2501 through which the flexible substrate (not shown) can pass. In one or more embodiments, the flexible substrate, which can bend as the first device housing 102 and the second device housing 103 pivot about the hinge housing 2401 to the closed position 200 of FIG. 25, allows electrical signals to pass back and forth between circuit components disposed in the first device housing 102 and the second device housing 103.

As was the case with FIGS. 14-15, in FIGS. 25 and 26 the hinge housing 2401 and its corresponding support plates 2420,2422 serve two functions: First, they provide mechanical support for the flexible display 121 when the first device housing 102 has pivoted about the hinge housing 2401 relative to the second device housing 103 to an axially displaced open position 400 of FIG. 26. Second, when the first device housing 102 pivots about the hinge housing 2401 relative to the second device housing 103 to the closed position 200 of FIG. 25, the support plates 2420,2422 translate along their respective inclined planes to recede into the first device housing 102 and second device housing 103. This "collapse" of the first support plate 2420 and the second support plate 2422 creates a cavity in the hinge portion of the electronic device 100 shown in FIG. 25 that allows the flexible display 121 to form its service loop. As before, the interior face 2503 of the hinge housing 2401 is positioned farther outward from the first device housing 102 and the second device housing 103, respectively, when the first device housing 102 and second device housing 103 are pivoted about the hinge housing 2401 to the closed position 200 than when the first device housing 102 and second device housing 103 are pivoted about the hinge housing 2401 to the axially displaced open position 400.

Figure 27:
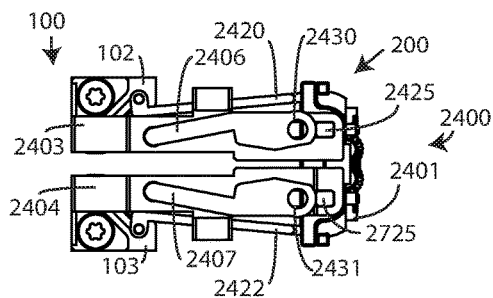
FIG. 27 illustrates another explanatory spring mechanism in accordance with one or more embodiments of the disclosure when in the closed position.
Figure 28:
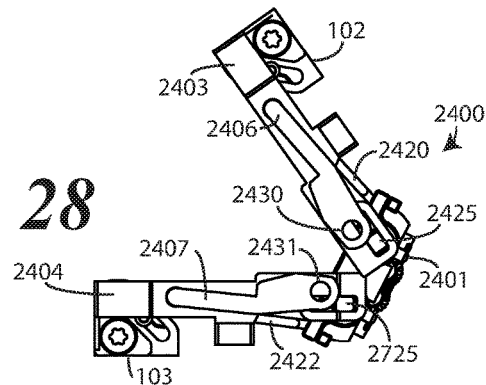
FIG. 28 illustrates the explanatory spring mechanism of FIG. 27 when in the partially open position.
Figure 29:
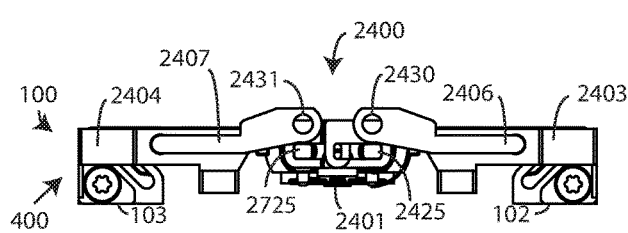
FIG. 29 illustrates the explanatory spring mechanism of FIG. 27 when in the axially displaced open position.

Turning now to FIGS. 27-29, illustrated therein is another sectional view of the electronic device 100 of FIGS. 1-8, which utilizes the hinge mechanism 2400 of FIG. 24 in this illustrative embodiment. FIGS. 27-29 also illustrate the inclined planes being augmented with, and bounded by, inclined apertures within which posts extending distally from the edges of the first support plate 2420 and second support plate 2422 insert. This configuration latches and retains the posts within the inclined apertures, thereby defining an enclosed track within which the posts may travel as the electronic device 100 pivots between the axially displaced open position 400 and the closed position 200.

As shown in FIGS. 27-29, the electronic device 100 includes a first device housing 102 and a second device housing 103. A hinge housing 2401 comprising a hinge that couples the first device housing 102 to the second device housing 103.

In one or more embodiments, the hinge comprises at least a first sliding link 2402 coupled between a first device housing connection point situated at the first device housing 102 and a first hinge housing pivot point 2425 situated at the hinge housing 2401, In this illustrative embodiment, the hinge also comprises a second sliding link 2403 coupled between a second device housing connection point situated at the second device housing 103 and a second hinge housing pivot point 2725 situated at the hinge housing 2401.

In one or more embodiments, one or more of the first sliding link 2402 or the second sliding link 2403 is slidable along the first hinge housing pivot point 2425 or the second hinge housing pivot point 2725, respectively, to cause a displacement between the first device housing 102 and the second device housing 103, as well as between the first device housing 102 and the hinge housing 2401 and the second device housing 103 and the hinge housing 2401, to change as the first device housing 102 pivots relative to the second device housing 103 about the hinge housing 2401 from the closed position 200 to an axially displaced open position 400.

In one or more embodiments, this sliding is the result of the operation of a first linking arm 2406 and a second linking arm 2407. To wit, in the illustrative embodiment of FIGS. 27-29 the first linking arm 2406 is coupled to the first sliding link 2402, while the second linking arm 2407 is coupled to the second sliding link 2403. In one or more embodiments, the first linking arm 2406 causes the first sliding link 2402 to slide along the first hinge housing pivot point 2425 as the first device housing 102 pivots relative to the second device housing 103 about the hinge housing 2401 from the closed position 200 to an axially displaced open position 400. Similarly, the second linking arm 2407 causes the second sliding link 2403 to slide along the second hinge housing pivot point 2725 as the first device housing 102 pivots relative to the second device housing 103 about the hinge housing 2401 from the closed position 200 to the axially displaced open position 400. In this illustrative embodiment the first linking arm 2406 and the second linking arm 2407 are coupled to the hinge housing 2401 at two different hinge housing pivot points, namely, a first hinge housing pivot point 2430 and a second hinge housing pivot point 2431, respectively.

As previously described, in this illustrative embodiment the first sliding link 2402 and the second sliding link 2403 each define an aperture within which the first hinge housing pivot point 2425 and the second hinge housing pivot point 2725 can translate, respectively, between at least a first location and a second location. As before, the first location is more centrally located within the first sliding link 2402 and second sliding link 2403, respectively, than the second location.

As best seen in FIG. 28, the first hinge housing pivot point 2425 and the second hinge housing pivot point 2725 situate at the first location when the first device housing 102 and the second device housing 103 pivot about the hinge housing 2401 to the axially displaced open position 400. By contrast, as best seen in FIG. 27, the first hinge housing pivot point 2425 and the second hinge housing pivot point 2725 situate at the second location when the first device housing 102 and the second device housing 103 pivot about the hinge housing 2401 to the axially displaced open position 400.

Figure 30:
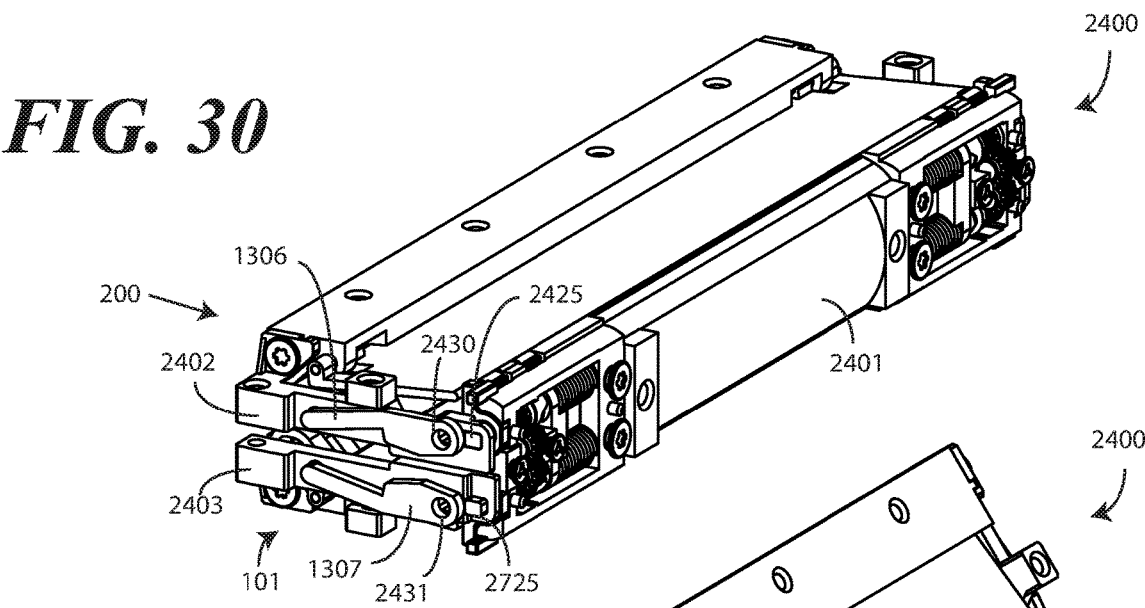
FIG. 30 illustrates the explanatory spring mechanism of FIG. 24 in the closed position.
Figure 31:
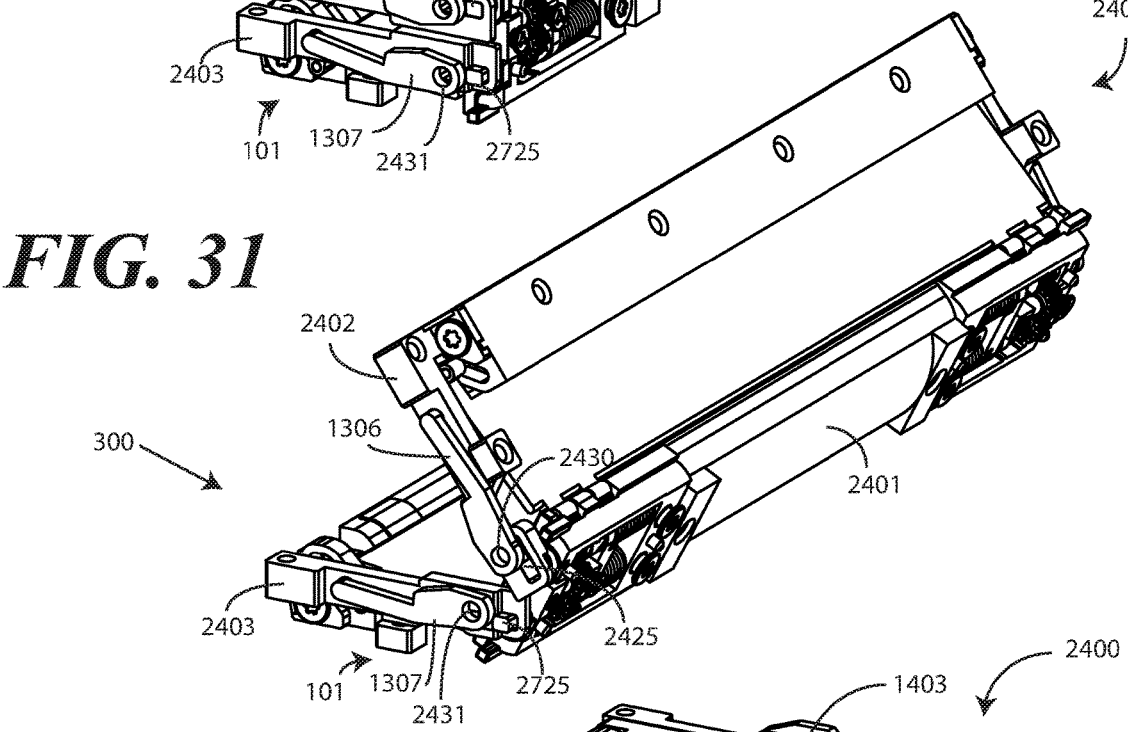
FIG. 31 illustrates the explanatory spring mechanism of FIG. 24 in a partially open position.
Figure 32:
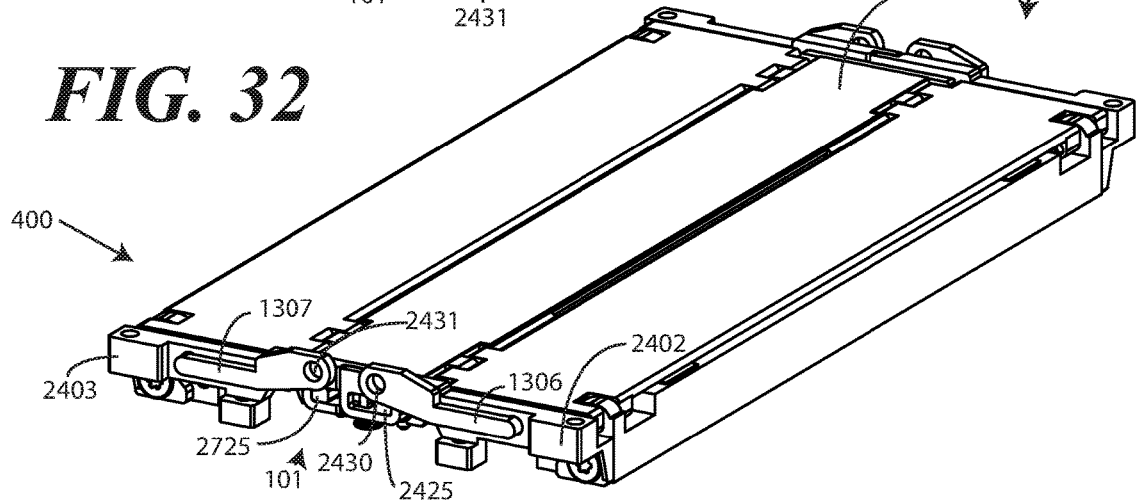
FIG. 32 illustrates the explanatory spring mechanism of FIG. 24 in the axially displaced open position.

Turning now to FIGS. 30-32, illustrated therein are perspective views of the hinge mechanism 2400 of FIGS. 27-29, without the first device housing or second device housing, so as to show additional details of the hinge mechanism 2400 to provide even better clarity of the action of the hinge mechanism during the pivoting process. Since the functions of the hinge mechanism 2400 as it passes to or through the closed position 200, the partially closed position 300, and the axially displaced open position 400 were fully described above with reference to FIGS. 27-29, only a brief synopsis of the operation of the hinge mechanism 2400 will be reprised here simply to underscore the operation for clarity.

As previously described, a hinge housing 2401 comprising a hinge 101. The hinge 101 is configured to couple a first device housing (102) to the hinge housing 2401 with a first sliding link 2402. The hinge 101 is also configured to couple a second device housing (103) to the hinge housing 2401 with a second sliding link 2403.

As before, the hinge 101 is configured to change a displacement between the hinge housing 2401 and the first device housing (102) and second device housing (103), respectively, when the first device housing (102) and the second device housing (103) pivot about the hinge housing 2401 between the axially displaced open position 400 and the closed position 200. In particular, the hinge 101 makes the displacement of the first device housing (102) and the second device housing (103) relative to the hinge housing 2401 shorter when the first device housing (102) and the second device housing (103) are pivoted about the hinge housing 2401 to the axially displaced open position 400 than when the first device housing (102) and second device housing (103) are pivoted about the hinge housing 2401 to the closed position 200.

This operative action results in the interior surface 1403 of the hinge housing 2401 being positioned farther from the first device housing (102) and the second device housing (103), respectively, when the first device housing (102) and second device housing (103) are pivoted about the hinge housing 2401 to the closed position 200 than when the first device housing (102) and second device housing (103) are pivoted about the hinge housing 2401 to the axially displaced open position 400. This operative action also results in the first sliding link 2402 and the second sliding link 2403 extending farther from the hinge housing 2401, as shown in FIG. 30, when the first device housing (102) is pivoted about the hinge housing 2401 relative to the second device housing (103) to the closed position 200 than when the first device housing (102) is pivoted about the hinge housing 2401 relative to the second device housing (103) to the axially displaced open position 400, as shown in FIG. 31.

As before, the sliding action, and thus displacement change, is the result of one or more linking arms. Specifically, in FIGS. 30-32 a first linking arm 2406 is coupled between a first hinge housing pivot point 2430 at the hinge housing 2401 and the first sliding link 2402, while a second linking arm 2407 is coupled between a second hinge housing pivot point 2431 at the hinge housing 2401, which is different from the first hinge housing pivot point 2430, and the second sliding link 2403. As previously described, the first linking arm 2406 and the second linking arm 2407 cause the first sliding link 2402 and the second sliding link 2403 to translate along a first hinge housing pivot point 2425 and a second hinge housing pivot point 2725, respectively, when the first device housing (102) and the second device housing pivot (103) about the hinge housing 2401 between the closed position 200 and the axially displaced open position 400.

One advantage of using the hinge mechanism 2400 of FIG. 24 over the hinge mechanism (1300) of FIG. 13 is that the first hinge housing pivot point 2425 and second hinge housing pivot point 2725 move faster through the apertures of the first linking arm 2406 and the second linking arm 2407 at the onset of transitioning the hinge mechanism 2400 from the axially displaced open position 400 toward the closed position 200. This can be advantageous as it can cause the interior surface 1403 of the hinge housing 2401 to move away from the flexible display (121) spanning the hinge housing 2401 more quickly than is the case with the hinge mechanism (1300) of FIG. 13. This can advantageously work to prevent interference with the flexible display (121) during the bending process.

Figure 33:
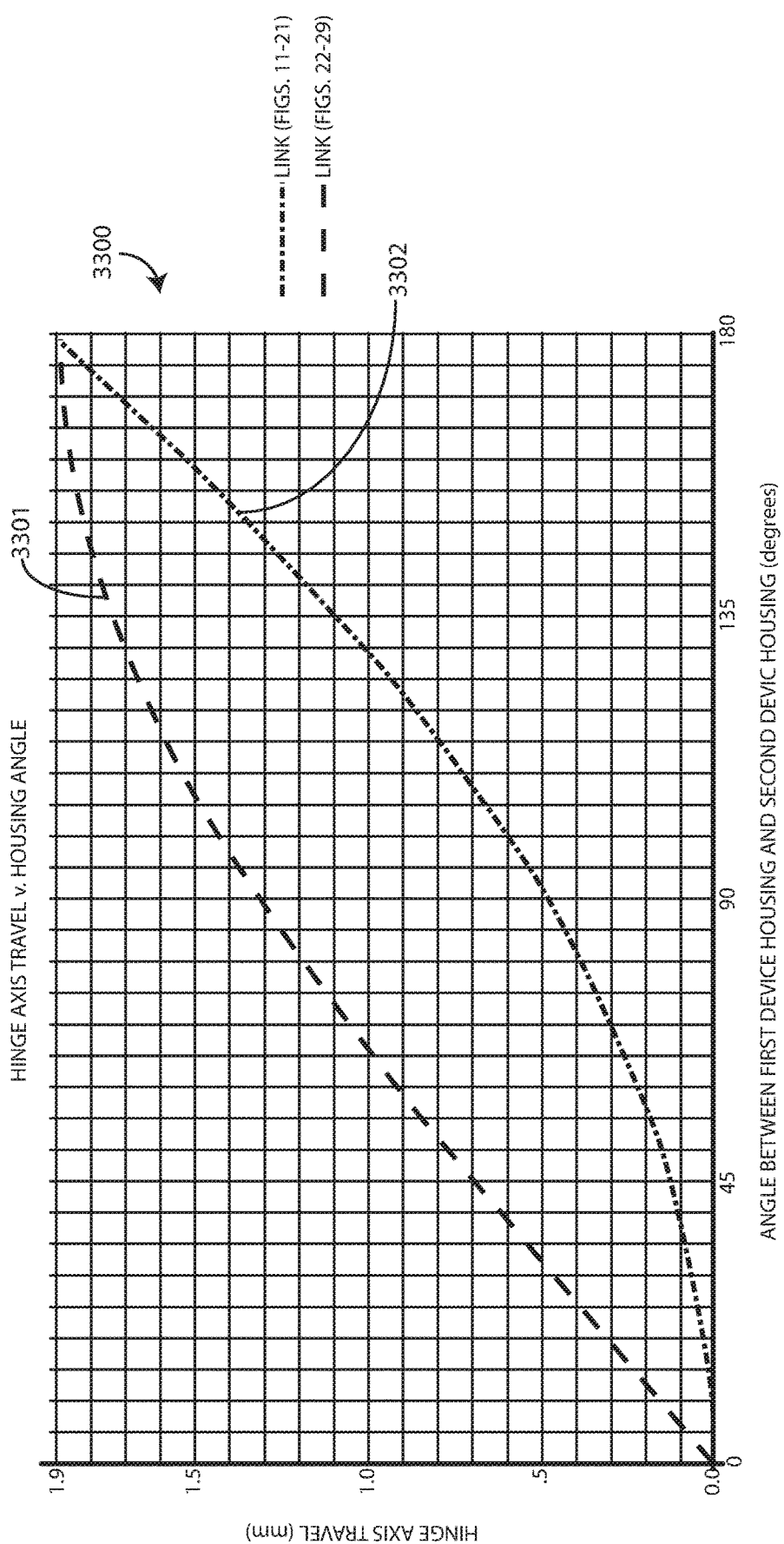
FIG. 33 illustrates a comparison of hinge mechanism travel to device housing angle for two explanatory hinges configured in accordance with one or more embodiments of the disclosure.

Turning now to FIG. 33, illustrated therein is a graph 3300 showing just how substantial this change in motion can be. Plot 3301 depicts travel of the first hinge housing pivot point (2425) and second hinge housing pivot point (2725) through the apertures of the first linking arm (2406) and the second linking arm (2407) in the hinge mechanism (2400) of FIG. 24, while plot 3302 depicts travel of the first hinge housing pivot point (1325) and second hinge housing pivot point (1625) through the apertures of the first linking arm (1306) and the second linking arm (1307) of the hinge mechanism (1300) of FIG. 13.

As can clearly be seen in the lower left portion of the graph 3300, the travel of the first hinge housing pivot point (2425) and second hinge housing pivot point (2725) through the apertures of the first linking arm (2406) and the second linking arm (2407) in the hinge mechanism (2400) of FIG. 24 is substantially higher than is the travel of the first hinge housing pivot point (1325) and second hinge housing pivot point (1625) through the apertures of the first linking arm (1306) and the second linking arm (1307) of the hinge mechanism (1300) of FIG. 13. This pulls the interior surface (1403) of the hinge housing (2401) away from the flexible display (121) more rapidly, thereby precluding any interference between the flexible display (121) and the hinge housing (2401).

Figure 34:
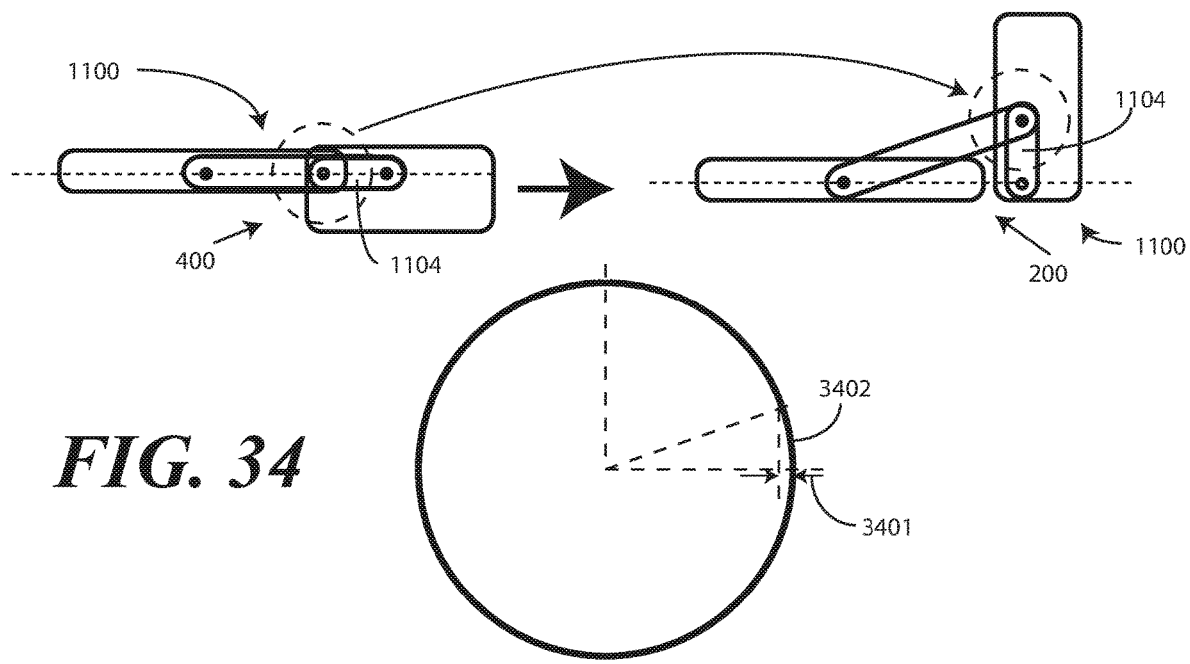
FIG. 34 illustrates hinge mechanism travel for a first explanatory hinge configured in accordance with one or more embodiments of the disclosure.
Figure 35:
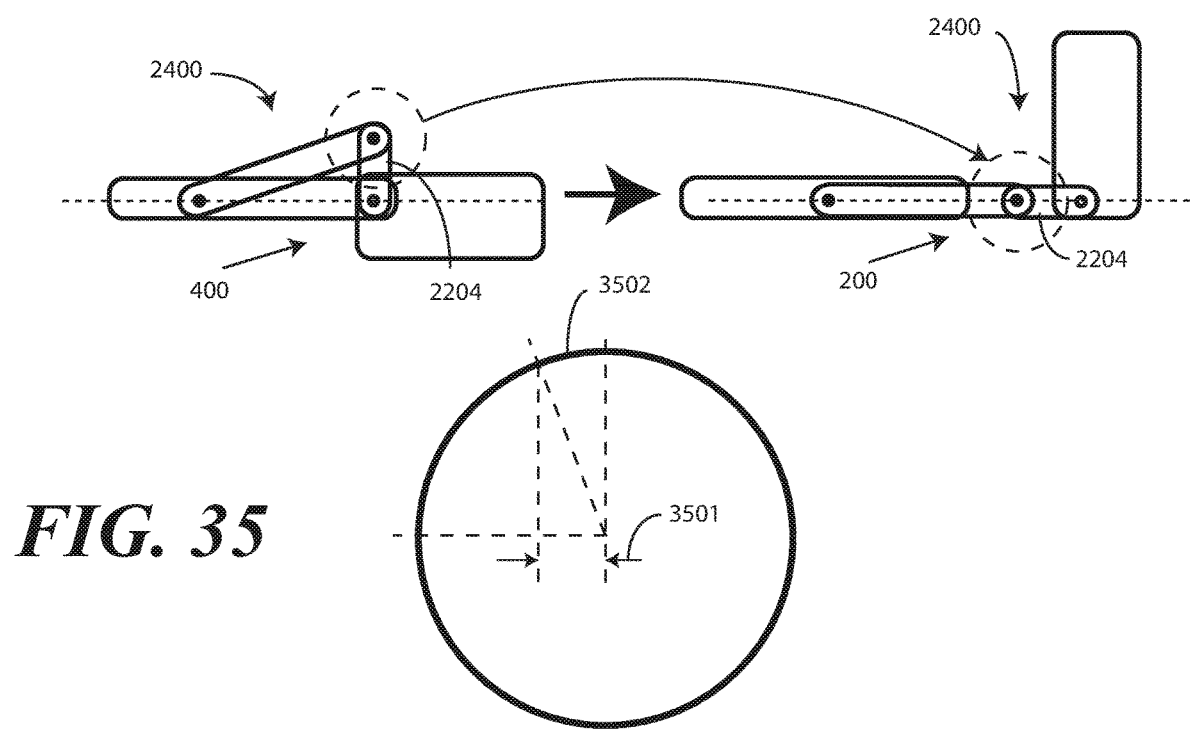
FIG. 35 illustrates hinge mechanism travel for a second explanatory hinge configured in accordance with one or more embodiments of the disclosure.

The reason this occurs is shown in FIGS. 34-35. Turning now to FIGS. 34 and 35, FIG. 34 illustrates the hinge mechanism 1100 of FIGS. 11-12 transitioning from the axially displaced open position 400 to the closed position 200, while FIG. 35 illustrates the hinge mechanism 2200 of FIGS. 22-23 transitioning between the axially displaced open position 400 and the closed position 200. Since the linking arm 1104 is initially oriented horizontally in FIG. 34, the hinge housing pivot points can only translate a relatively small distance 3401 within the apertures of the sliding links for a relatively large amount 3402 of initial bending of the hinge mechanism 1100. By contrast, since the linking arm 2204 is oriented vertically in FIG. 35, this enables the hinge housing pivot points to travel a much greater distance 3501 within the apertures of the sliding links for the same amount 3502 of bending of the hinge mechanism 2400. This difference in distance is reflected in the graph (3300) of FIG. 33 and can make use of the hinge mechanism 2400 of FIG. 35 preferable in electronic devices employing flexible displays.

As mentioned above, however, not all electronic devices configured in accordance with embodiments of the disclosure employ flexible displays. Accordingly, in other applications it may be desirous to use the hinge mechanism 1100 of FIG. 34. One such example is shown in FIG. 36.

Figure 36:
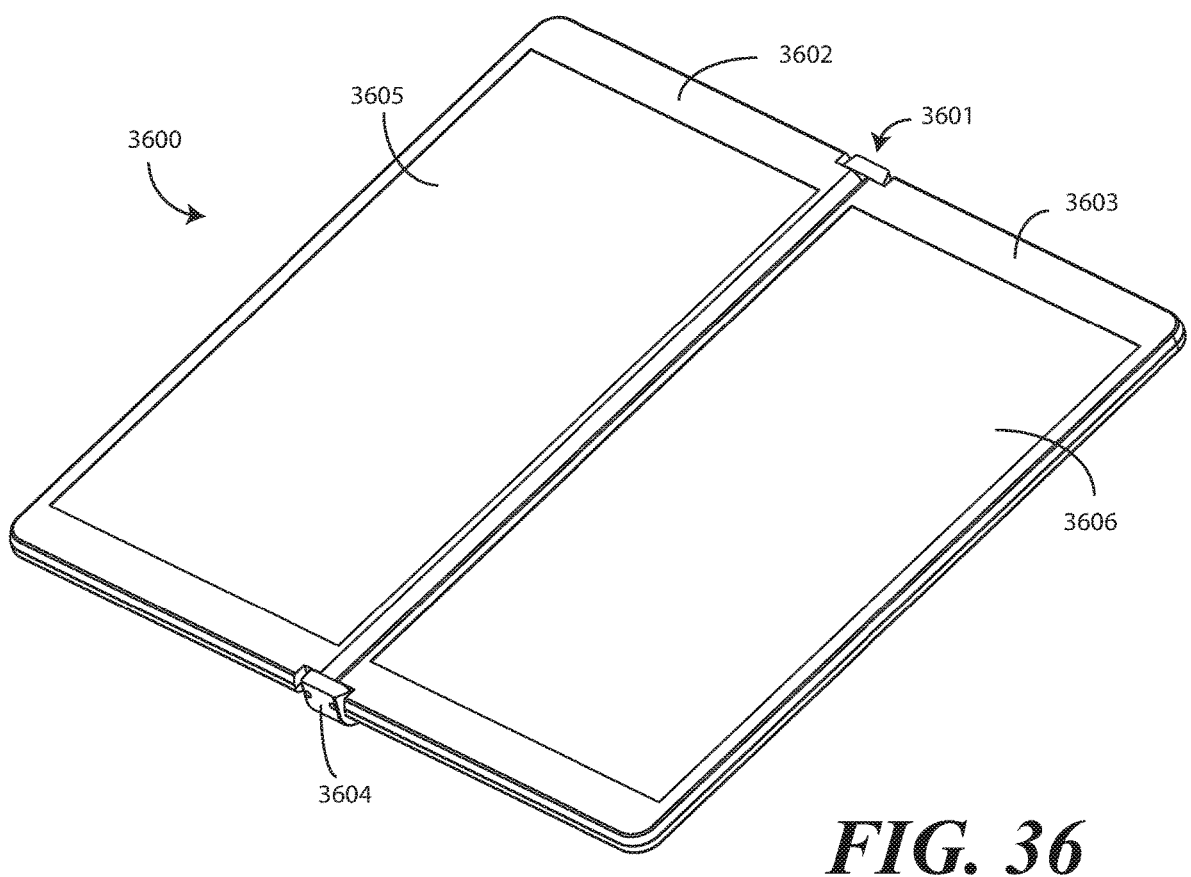
FIG. 36 illustrates an alternate electronic device configured in accordance with one or more embodiments of the disclosure.

Turning now to FIG. 36, illustrated therein is one embodiment where the flexible display and support plates are omitted. As shown in FIG. 36, an electronic device 3600 includes a first device housing 3602 and a second device housing 3603. A hinge 3601, which comprises a hinge body 3604, couples the first device housing 3602 to the second device housing 3603. The first device housing 3602 is pivotable about the hinge 3601 relative to the second device housing 3603 between an axially displaced open position and a closed position, as previously described.

Rather than having a flexible display, in this embodiment the electronic device 3600 includes a first display 3605 coupled to the first device housing 3602 and a second display 3606 coupled to the second device housing 3603.

Thus, in addition to separating the first device housing 3602 from the second device housing 3603, the hinge 3601 separates the first display 3605 from the second display 3606 as well.

Figure 37:
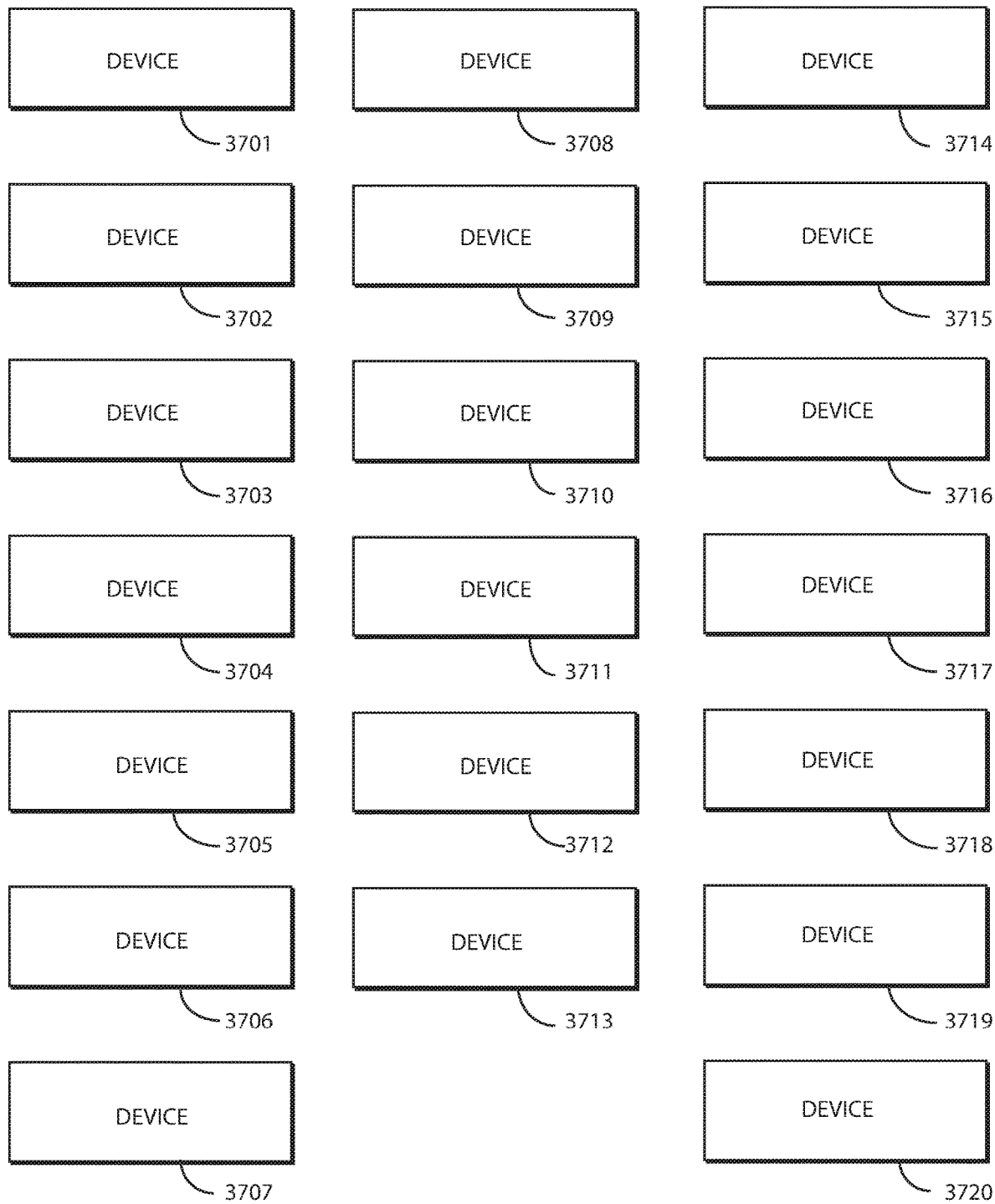
FIG. 37 illustrates various embodiments of the disclosure.

Turning now to FIG. 37, illustrated therein are various embodiments of the disclosure. The embodiments of FIG. 37 are shown as labeled boxes in FIG. 37 due to the fact that the individual components of these embodiments have been illustrated in detail in FIGS. 1-36, which precede FIG. 37. Accordingly, since these items have previously been illustrated and described, their repeated illustration is no longer essential for a proper understanding of these embodiments. Thus, the embodiments are shown as labeled boxes.

At 3701, an electronic device comprises a first device housing and a second device housing. At 3701, a hinge housing comprising a hinge is coupled to the first device housing and the second device housing such that the first device housing is pivotable about the hinge housing between an axially displaced open position and a closed position. At 3701, the hinge changes a displacement between the hinge housing and the first device housing and second device housing, respectively, when the first device housing and the second device housing pivot about the hinge housing between the axially displaced open position and the closed position.

At 3702, the displacement of 3701 is shorter when the first device housing and the second device housing are pivoted about the hinge housing to the axially displaced open position than when the first device housing and second device housing are pivoted about the hinge housing to the closed position. At 3703, the hinge housing of 3702 defines an interior face that is positioned farther from the first device housing and the second device housing, respectively, when the first device housing is pivoted about the hinge housing to the closed position than when the first device housing is pivoted about the hinge housing to the axially displaced open position.

At 3704, the hinge of 3702 comprises a first sliding link coupling the hinge to the first device housing at a first device housing connection point and a second sliding link coupling the hinge to the second device housing at a second device housing connection point. At 3705, the hinge of 3704 further comprises a first linking arm coupled to the first sliding link and a second linking arm coupled to the second sliding link.

At 3706, the first linking arm and the second linking arm of 3705 are coupled to the hinge housing at a single hinge housing pivot point. At 3707, the first linking arm of 3705 is coupled to the hinge housing at a first hinge housing pivot point and the second linking arm is coupled to the hinge housing at a second hinge housing pivot point. At 3708, the first linking arm of 3707 pivots about a first axis and the second linking arm pivots about a second axis, wherein the first axis and the second axis are separate and parallel.

At 3709, the first sliding link of 3705 is coupled to the hinge housing at a first hinge housing pivot point and the second sliding link is coupled to the hinge housing at a second hinge housing pivot point. At 3710, the first sliding link of 3709 and the second sliding link each define an aperture within which the first hinge housing pivot point and the second hinge housing pivot point can translate, respectively, between at least a first location and a second location.

At 3711, the first location of 3710 is more centrally located within the first sliding link and second sliding link, respectively, than the second location. At 3711, the first hinge housing pivot point and the second hinge housing pivot point situate at the first location when the first device housing is pivoted about the hinge housing to the axially displaced open position.

At 3712, the electronic device of 3710 further comprises a first support plate pivotally coupled to a first side of the hinge housing and extending distally into the first device housing from the first side of the hinge housing and a second support plate pivotally coupled to a second side of the hinge housing and extending distally into the second device housing from the second side of the hinge housing. At 3712, each of the first device housing and the second device housing define a support plate receiving recess comprising an inclined plane. At 3712, a distal end of each of the first support plate and the second support plate travels along the inclined plane between a first support plate position within the first device housing and the second device housing, respectively, with the distal end situated at a top of the inclined plane, to a second support plate position within the first device housing and the second device housing, respectively, with the distal end situated at a bottom of the inclined plane, when the first device housing and the second device housing pivot about the hinge from an axially displaced open position to a closed position.

At 3713, the electronic device of 3712 further comprises a flexible display spanning the hinge housing. At 3713, a first end of the flexible display is fixedly coupled to the first device housing and a second end of the flexible display is fixedly coupled to the second device housing.

At 3714, the electronic device of 3705 further comprises interlocking gears coupled to the first sliding link and the second sliding link. At 3714, the interlocking gears cause a symmetric angular rotation of the first sliding link and the second sliding link, respectively, when the first device housing pivots about the hinge housing relative to the second device housing.

At 3715, an electronic device comprises a first device housing and a second device housing. At 3715, the electronic device comprises a hinge housing comprising a hinge. AT 3715, the hinge comprises a first sliding link coupled between a first device housing connection point situated at the first device housing and a first hinge housing pivot point situated at the hinge housing and a second sliding link coupled between a second device housing connection point situated at the second device housing and a second hinge housing pivot point situated at the hinge housing. At 3715, one or more of the first sliding link or the second sliding link is slidable along the first hinge housing pivot point or the second hinge housing pivot point, respectively, to cause a displacement between the first device housing and the second device housing relative to the hinge housing to change as the first device housing pivots relative to the second device housing about the hinge housing from a closed position to an axially displaced open position.

At 3716, the electronic device of 3715 further comprises a first linking arm coupled to the first sliding link. At 3716, the first linking arm causes the first sliding link to slide along the first hinge housing pivot point as the first device housing pivots relative to the second device housing about the hinge housing from the closed position to the axially displaced open position.

At 3717, the electronic device of 3716 further comprises a second linking arm coupled to the second sliding link. At 3717, the second linking arm causes the second sliding link to slide along the first hinge housing pivot point as the first device housing pivots relative to the second device housing about the hinge housing from the closed position to the axially displaced open position. At 3718, the first linking arm of 3717 and the second linking arm are coupled to the hinge housing at a third hinge housing pivot point and a fourth hinge housing pivot point, respectively.

At 3719, an electronic device comprises a first device housing and a second device housing. At 3719, a hinge housing comprising a hinge couples the first device housing to the hinge housing with a first sliding link and the second device housing to the hinge housing with a second sliding link. At 3719, the first sliding link and the second sliding link extend farther from the hinge housing when the first device housing is pivoted about the hinge housing relative to the second device housing to a closed position than when the first device housing is pivoted about the hinge housing to an axially displaced open position.

At 3720, the electronic device of 3719 further comprises a first linking arm coupled between the hinge housing and the first sliding link and a second linking arm coupled between the hinge housing and the second sliding link. At 3720, the first linking arm and the second linking arm cause the first sliding link and the second sliding link to translate along a first hinge housing pivot point and a second hinge housing pivot point, respectively, when the first device housing and the second device housing pivot about the hinge housing between the closed position and the axially displaced open position.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. An electronic device, comprising:
a first device housing and a second device housing; and
a hinge housing comprising a hinge coupled to the first device housing and the second device housing such that the first device housing is pivotable about the hinge housing between an axially displaced open position and a closed position, the hinge comprising a first sliding link coupling the hinge to the first device housing and a second sliding link coupling the hinge to the second device housing, the first sliding link and the second sliding link each defining a rectangular aperture;
the hinge changing a displacement between the hinge housing and the first device housing and second device housing, respectively, when the first device housing and the second device housing pivot about the hinge housing between the axially displaced open position and the closed position;
the hinge further comprising a first linking arm coupled to the first sliding link and a second linking arm coupled to the second sliding link, the first linking arm and the second linking arm providing a checkrein and pushrod action causing pivot points of the hinge housing situated within the rectangular aperture to translate linearly in the rectangular aperture.

2. The electronic device of claim 1, wherein the displacement is shorter when the first device housing and the second device housing are pivoted about the hinge housing to the axially displaced open position than when the first device housing and second device housing are pivoted about the hinge housing to the closed position.

3. The electronic device of claim 2, the hinge housing defining an interior face that is positioned farther from the first device housing and the second device housing, respectively, when the first device housing is pivoted about the hinge housing to the closed position than when the first device housing is pivoted about the hinge housing to the axially displaced open position.

4. The electronic device of claim 2, the first sliding link coupled to the hinge housing at a first hinge housing connection point defined by a post and the second sliding link coupled to the hinge housing at a second hinge housing connection point defined by another post.

5. The electronic device of claim 4, wherein the rectangular aperture is wider than the post, thereby allowing the post to translate within the rectangular aperture from a first location of the rectangular aperture abutting a first end of the rectangular aperture and separated from a second end of the rectangular aperture and a second location of the rectangular aperture abutting the second end of the rectangular aperture and separated from the first end of the rectangular aperture.

6. The electronic device of claim 5, the first sliding link coupled to the hinge housing at a post situated within the rectangular aperture, wherein the rectangular aperture is more than twice as wide as the post.

7. The electronic device of claim 1, the hinge further comprising a first linking arm coupled to the first sliding link and a second linking arm coupled to the second sliding link, wherein the first linking arm and the second linking arm are coupled to the hinge housing at a single hinge housing pivot point and provide a checkrein and pushrod action causing pivot points of the hinge housing situated within the rectangular aperture to translate from a first location separated from a first end of the rectangular aperture to a second location separated from a second end of the rectangular aperture.

8. The electronic device of claim 1, the hinge further comprising a first linking arm coupled to the first sliding link and a second linking arm coupled to the second sliding link, wherein the first linking arm is coupled to the hinge housing at a first hinge housing pivot point and the second linking arm is coupled to the hinge housing at a second hinge housing pivot point, wherein the first linking arm pivots about a first axis and the second linking arm pivots about a second axis, wherein the first axis and the second axis are separate and parallel.

9. The electronic device of claim 1, wherein the first linking arm is oriented substantially parallel relative to an interior surface of the hinge housing.

10. The electronic device of claim 1, the first sliding link coupled to the hinge housing at a post situated within the rectangular aperture, the post translating laterally within the rectangular aperture from a first location separated from a first end of the rectangular aperture to a second location separated from a second end of the rectangular aperture when the first device housing and the second device housing pivot about the hinge housing between the axially displaced open position and the closed position.

11. The electronic device of claim 1, further comprising a hinge housing pivot point translating within the rectangular aperture between at least a first location separated from a first end of the rectangular aperture and a second location separated from a second end of the rectangular aperture when the first device housing and the second device housing pivot about the hinge housing between the axially displaced open position and the closed position.

12. The electronic device of claim 11, wherein the hinge housing pivot is defined by a rectangular post.

13. The electronic device of claim 1, further comprising:
a first support plate pivotally coupled to a first side of the hinge housing, extending distally into the first device housing from the first side of the hinge housing, and bounded by a first inclined aperture; and
a second support plate pivotally coupled to a second side of the hinge housing, extending distally into the second device housing from the second side of the hinge housing, and bounded by a second inclined aperture;
wherein a distal end of each of the first support plate and the second support plate travels along the first inclined aperture and the second inclined aperture, respectively, between a first support plate position within the first device housing and the second device housing, respectively, to a second support plate position that is different from the first support plate position within the first device housing and the second device housing, respectively, when the first device housing and the second device housing pivot about the hinge from an axially displaced open position to a closed position.

14. The electronic device of claim 1, the rectangular aperture having rounded corners.

15. An electronic device, comprising:
a first device housing and a second device housing; and
a hinge housing comprising a hinge, the hinge comprising:
a first sliding link coupled between a first device housing connection point situated at the first device housing and a first hinge housing pivot point situated at the hinge housing; and
a second sliding link coupled between a second device housing connection point situated at the second device housing and a second hinge housing pivot point situated at the hinge housing;
wherein one or more of the first sliding link or the second sliding link defines an aperture within which the first hinge housing pivot point or the second hinge housing pivot point can slide, respectively, between a first location separated from a first side of the aperture to a second location separated from a second side of the aperture to cause a displacement between the first device housing and the second device housing relative to the hinge housing to change as the first device housing pivots relative to the second device housing about the hinge housing from a closed position to an axially displaced open position;
the hinge further comprising a first linking arm coupled to the first sliding link and a second linking arm coupled to the second sliding link, the first linking arm and the second linking arm providing a checkrein and pushrod action causing pivot points of the hinge housing situated within the aperture to translate linearly in the aperture.

16. The electronic device of claim 15, further comprising a first linking arm coupled to the first sliding link, the first linking arm causing linearly within the aperture from as the first device housing pivots relative to the second device housing about the hinge housing from the closed position to the axially displaced open position.

17. The electronic device of claim 15, the first hinge housing pivot point defined by a post having at least two flat sides.

18. The electronic device of claim 15, wherein a width of the aperture is greater than a height of the aperture.

19. An electronic device, comprising:
a first device housing and a second device housing; and
a hinge housing comprising a hinge coupling the first device housing to the hinge housing with a first sliding link and the second device housing to the hinge housing with a second sliding link;
wherein the first sliding link and the second sliding link define apertures having a width defining a distance the first sliding link and the second sliding link can extend farther from the hinge housing when the first device housing is pivoted about the hinge housing relative to the second device housing to a closed position than when the first device housing is pivoted about the hinge housing to an axially displaced open position;
the hinge further comprising a first linking arm coupled to the first sliding link and a second linking arm coupled to the second sliding link, the first linking arm and the second linking arm providing a checkrein and pushrod action causing pivot points of the hinge housing situated within the aperture to translate linearly in the aperture.

20. The electronic device of claim 19, further comprising a first linking arm coupled between the hinge housing and the first sliding link and a second linking arm coupled between the hinge housing and the second sliding link, the first linking arm and the second linking arm causing the apertures of the first sliding link and the second sliding link to translate along a first hinge housing pivot point and a second hinge housing pivot point, respectively, from a first location adjacent to an end of the apertures to a second location separated from the end of the apertures when the first device housing and the second device housing pivot about the hinge housing between the closed position and the axially displaced open position.

\* \* \* \* \*